United States Patent [19]

Wayner et al.

[11] Patent Number: 5,253,307
[45] Date of Patent: Oct. 12, 1993

[54] IMAGE ANALYSIS TO OBTAIN TYPEFACE INFORMATION

[75] Inventors: Peter C. Wayner; Daniel P. Huttenlocher, both of Ithaca, N.Y.

[73] Assignee: Xerox Corporation, Stamford, Conn.

[21] Appl. No.: 737,948

[22] Filed: Jul. 30, 1991

[51] Int. Cl.⁵ .................................................. G06R 9/48
[52] U.S. Cl. ........................................... 382/22; 382/9; 382/25; 382/39
[58] Field of Search .................. 382/22, 25, 18, 20, 382/9, 39, 13

[56] References Cited

U.S. PATENT DOCUMENTS

| | | | |
|---|---|---|---|
| 2,838,602 | 6/1958 | Sprick | 178/15 |
| 2,983,822 | 5/1961 | Brouillette, Jr. | 250/202 |
| 3,297,989 | 1/1967 | Atchley et al. | 340/146.3 |
| 3,634,822 | 1/1972 | Chow | 340/146.3 S |
| 4,379,283 | 4/1983 | Ito et al. | 382/18 |
| 4,468,809 | 8/1984 | Grabowski et al. | 382/50 |
| 4,499,499 | 2/1985 | Brickman et al. | 358/263 |
| 4,802,230 | 1/1989 | Horowitz | 382/22 |
| 4,831,657 | 5/1989 | Casey et al. | 382/39 |
| 4,850,026 | 7/1989 | Jeng et al. | 382/21 |
| 4,933,979 | 6/1990 | Suzuki et al. | 382/61 |
| 5,054,094 | 10/1991 | Barski | 382/18 |
| 5,058,182 | 10/1991 | Kuan et al. | 382/25 |
| 5,111,516 | 5/1992 | Nakano et al. | 382/25 |
| 5,113,453 | 5/1992 | Simon | 382/25 |
| 5,181,255 | 1/1993 | Bloomberg | 382/9 |
| 5,185,818 | 2/1993 | Warnock | 382/54 |

FOREIGN PATENT DOCUMENTS

288266 10/1988 Japan.

OTHER PUBLICATIONS

Brickman et al., Word Autocorrelation Redundancy Match (WARM) Technology, *IBM Journal of Research and Development*, 26:6, Nov. 1982, pp. 681–686.

Xerox Imaging Systems announces ScanworX scanning system, Typeworld, Boston, Mass. Mar. 15, 1991.

Primary Examiner—Joseph Mancuso

[57] ABSTRACT

Dominant typeface, including point size, of text in an image is identified by measuring distances across connected components in each of plural directions to obtain distribution data. The distribution data indicate a distribution of distances across connected components in each direction for the image. The distribution data are then used to obtain typeface data indicating the dominant typeface of characters in the text. Distance can be measured from each of a set of pixels that are inside or on edges of connected components to an edge of a connected component. The distances for each direction can be combined, such as by obtaining an average or other measure of central value, so that the combined distances indicate the distribution of distances in the direction. The distribution data can be used to form a profile that can be compared or clustered with other profiles to identify similar profiles or to find a matching profile. Skew can be obtained and used in forming profiles that are independent of skew. The comparisons can be independent of differences in character scale. A machine can store a set of model profiles of known typeface and point size in memory and can compare a profile for an image with each model profile to find the closest match, providing an identifier of its dominant typeface and point size. A machine could also store an input image in memory, obtain data indicating its dominant typeface, modify the stored data according to the dominant typeface, and provide an output image based on the modification. Profiles can be stored or transmitted, and a product can include a model profile together with code for operating a processor to obtain a profile for an image and code for operating the processor to compare the profile for the image with the model profile.

33 Claims, 14 Drawing Sheets

IMAGE ANALYSIS TO OBTAIN TYPEFACE INFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques that obtain information about the dominant typeface of text in an image.

Chow, U.S. Pat. No. 3,634,822, describes character recognition techniques that identify characters in each of three different fonts. As shown and described in relation to FIG. 1, each character is scanned to obtain a binary word representation of the character. This representation is applied to three tables storing probability representations for each known character in the three fonts. Character comparison functions for each character in each font are produced and applied to three accumulators, shown in FIG. 2D, to provide three font comparison functions for the unknown character. From these functions the font is determined without identifying the character. From the results of font identification, font frequency functions are derived for modifying the character comparison functions, which are then compared to identify the unknown character. Brickman et al., U.S. Pat. No. 4,499,499, describe techniques for identifying and compacting text data to be transmitted over communication lines. As shown and described in relation to FIG. 5, character matching is performed to identify characters in order to identify the font of the input data. The matching includes a preliminary screening, based on ascender, descender, width, and height, and a template match that produces a total correlation value, enhanced by sensitive feature data. As described beginning at col. 17 line 34, font match statistics indicate the frequency with which prestored fonts contribute to character matching. These statistics are used to determine if the font is known or which fonts are still candidates. If enough characters in a given word match a given font, it is presumed that the words on a page are printed in that font.

Brickman, N. F. and Rosenbaum, W. S., "Word Autocorrelation Redundancy Match (WARM) Technology," *IBM Journal of Research and Development*, Vol. 26, No. 6, November 1982, pp. 681–686, apparently describing the same techniques as Brickman et al., U.S. Pat. No. 4,499,499, indicates at page 685 that font detection statistics have consistently shown very peaked response characteristics, demonstrating rapid and accurate font discrimination. Typical results give 90 percent character match in only the single correct font and less than 0.1 percent correct character match in an incorrect font.

Grabowski et al., U.S. Pat. No. 4,468,809, describe multiple font optical character recognition (OCR) techniques. As shown and described in relation to FIGS. 1, 8, 14, 50A, 50B, and 51, the operator can individually designate the font to be recognized in each of two fields, and templates for comparison are provided in response. In a remittance processing (RPS) mode described beginning at col. 13 line 43, the OCR technique automatically reads any one of four fonts depending on which of three special symbols are encountered in the first 25 millimeters of the document, reading the fourth if no special symbol is detected.

Suzuki et al., U.S. Pat. No. 4,933,979, describe techniques for reading data from a form sheet. As shown and described in relation to FIG. 4B, a multi-font mode can be designated in which it is possible to automatically discriminate the writing style if it is one of six predetermined kinds that are frequently used. A dictionary can be selected depending on the discriminated writing style, and character recognition can be carried out based on the automatically selected kind of dictionary.

Umeda et al., EP-A-288 266, describe techniques for discriminating between handwritten and machine-printed characters. As described at page 2 lines 7–15, similarity of machine-printed characters is determined from similarity of overall shape, while similarity of handwritten characters is determined on the basis of features such as horizontal, vertical, or slanted lines. For effective recognition, two optical character readers (OCRs) are provided for the respective recognition techniques. Errors result from processing handwritten characters with the OCR for machine-printed characters, but this could be avoided if it is known before recognition with OCRs whether the characters are machine-printed or handwritten. As shown and described in relation to FIG. 2, the discrimination is made by detecting that the occurrence ratio of the slanted stroke component to the total of horizontal, vertical, and slanted stroke components is above an experimentally determined level.

SUMMARY OF THE INVENTION

The invention provides techniques that obtain data indicating a distribution of distances across connected components in each of a plurality of directions within an image that includes text. The distribution data are then used to obtain typeface data indicating a dominant typeface for characters in the text.

One aspect of the invention is based on the discovery that the dominant typeface of characters in an image can be identified without recognizing characters. This discovery avoids problems that arise in identifying typeface based on character recognition, whether by template matching or feature extraction and analysis. In order to perform character recognition, characters must be segmented, but segmenting may be difficult if characters have bled together or are connected. In addition, errors in recognizing characters may cause errors in identifying typeface.

This aspect is further based on the discovery of techniques that can identify typeface without segmenting or recognizing characters and without extracting information specific to a single character. The techniques produce, for each of a number of directions, distribution data indicating a distribution of distances across connected components in the direction for the image. Surprisingly, the distribution data can then be used to obtain typeface data indicating a dominant typeface of the characters. The distance distributions include information about character shape that indicates dominant typeface. For example, the distance distributions may indicate lengths, widths, and orientations of strokes in characters, including such typeface related features as serif size and shape, stroke width variability, vertical component strength, aspect ratio, rhythm, and density of characters. The characters of different typefaces may therefore have distinguishable distance distributions at certain directions.

This aspect of the invention can be implemented, for example, by obtaining an average distance in each of a number of equally separated directions that together cover a range of 360°, so that the average distances together form a profile of distance distribution as a function of direction for the image. The directions can be separated by a relatively small angle for fine coverage of the range. Profiles can be compared to find similarities and differences. For example, a profile for text of an unknown dominant typeface could be compared with one or more model profiles for known typefaces to determine how well it matches each known typeface; if it matches one of the known typefaces very well, its dominant typeface could be identified as the matching typeface, and an identifier of the typeface could be provided, perhaps as part of character recognition output. Or profiles of a number of images of text could be clustered to find equivalence classes. Or two profiles for texts of unknown dominant typeface could be compared to determine how well they match. Each of these operations can provide useful information because the profiles indicate dominant typeface.

Distances across connected components can be measured, for example, by measuring distance from a starting pixel in a connected component or on an edge of a connected component to the nearest edge in each of the directions. If the connected component includes only black pixels, the nearest edge in a given direction can be found by finding the nearest white pixel in that direction. Distances can be measured for sufficient starting pixels that the resulting distribution in each direction indicates a distribution of distances for the image. The starting pixels from which distances are measured can be selected by randomly or pseudorandomly generating a number indicating a candidate pixel, then determining whether the candidate pixel is in a connected component or on an edge of a connected component.

The measurement of distances at a number of directions in an image of text produces results that depend directly on the skew of lines of characters in the text. Therefore, to facilitate subsequent comparison, text line skew can be taken into account in producing a profile that is independent of skew. For example, skew can be measured, and then the directions in which distances are measured can be chosen based on the measured skew, so that equal directions for two profiles are both at the same angle in relation to the direction of text lines. As a result, profiles of average distance as a function of direction can be compared by comparing the average distances of equal directions.

The measurement of distances within connected components that form characters produces results that also depend directly on the size of the characters. In other words, the distances will depend on the extent to which the image has been magnified or reduced. This problem can be solved with a comparison technique that is insensitive to scale, such as a least squares technique that finds the optimal shift between profiles. This problem can also be solved by scaling or normalizing the distances before comparison, so that a euclidean difference can be obtained.

A closely related aspect of the invention is based on the observation that the features of a given typeface differ for different point sizes. The point sizes of a typeface are designed separately, and are not mere magnifications or reductions of each other. Therefore, a comparison with a profile for a known typeface is less accurate if point size is not taken into account. This problem can be solved by obtaining a separate profile for each point size of each known typeface and using these to make the comparisons. The best match then identifies both dominant typeface and point size, and an identifier of the dominant typeface and point size can be provided, perhaps as part of the output from character recognition.

The invention could also be used to improve character recognition. After dominant typeface and point size are identified, character recognition is easier because techniques can be used that are most effective for distinguishing characters in the identified dominant typeface and point size. To facilitate this and other applications of the invention, the invention could be implemented in a product that includes model profile data indicating a model profile. The product also includes profile obtaining means for operating the processor of a system to obtain image profile data from image data provided by image source means. The product also includes profile comparing means for operating the processor to obtain comparison data from the model profile data and the image profile data. The comparison data indicates the result of comparing the model profile and the image profile. The product could be used in a standard system such as a personal computer, and the image data could come from a scanner, from a memory, from a network connection, or from another appropriate source.

A machine implementing the invention can include image input means for receiving an input image and providing input image data and image output means for receiving output image data and providing an output image. A processor can store the input image data in memory, modify it in accordance with the dominant typeface indicated by typeface data, and then provide output image data to the output means based on the modified image data. For example, the output image data could include an identifier of dominant typeface and point size. This technique could be applied in a facsimile machine or another digital copier.

The following description, the drawings, and the claims further set forth these and other objects, features, and advantages of the invention.

BRIEF DESCRIPTION OF THE DRAWINGS

FIGS. 22A, 22B, 22C, 22D, and 22E each are a sample of an image of text of Avant Garde typeface with a varying degree of degradation.

FIGS. 23A, 23B, 23C, 23D, and 23E each are a sample of an image of text of Helvetica typeface with a varying degree of degradation.

FIG. 24A, 24B, 24C, 24D, and 24E each are a sample of an image of text of Bookman typeface with a varying degree of degradation.

DETAILED DESCRIPTION

A. Conceptual Framework

Figure 1A:
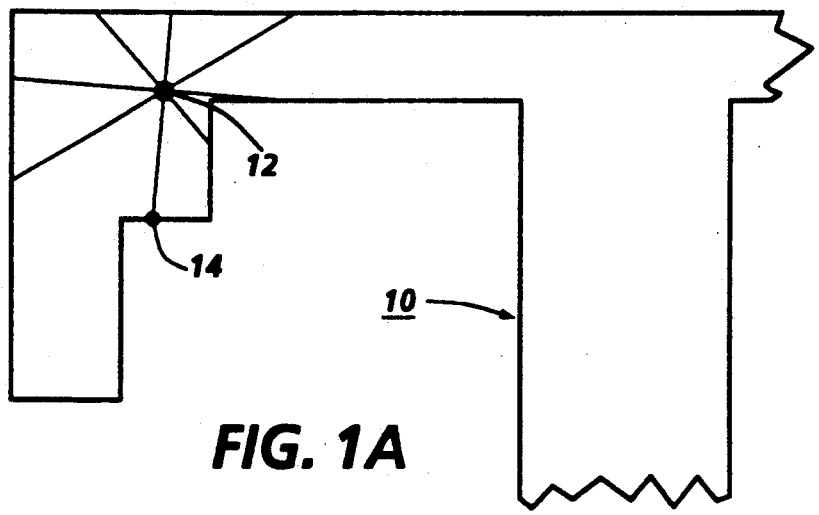
FIG. 1 is a schematic view of portions of a character in different typefaces showing measurements taken from a similar location.

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF." An "identifier" is an item of data that indicates one of a set of alternatives.

"Data" includes data existing in any physical form, and includes data that is transitory or is being stored or transmitted. For example, data could exist as an electromagnetic or other transmitted signal or as a signal stored in electronic, magnetic, or other form. A "data storage medium" or "storage medium" is a physical medium that stores data. A "data transmission medium" or "transmission medium" is a physical medium that transmits data from one location to another.

A "data processing system" is a system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

Data "indicates" an attribute when the data has a value that depends on the existence of the attribute or on a measure of the attribute.

Data indicates a "central value" of an attribute when it has a value that depends on a number of measurements of the attribute and indicates the center of the distribution of measurements. For example, data can indicate a central value of distances or of measurements of another scalar quantity by indicating a mean, mode, median, or other measure of central value.

Data indicates a "variance" of an attribute when it has a value that depends on a number of measurements of the attribute and indicates the degree to which the measurements vary. For example, data can indicate a standard deviation, a sum of squares, or other measure of variance.

Data indicates a "distribution" of an attribute when it has a value that depends on a number of measurements of the attribute. For example, data can indicate a distribution of distances or of measurements of another scalar quantity by indicating a measure of central value; a measure of variance; or a measure combining central value and variance such as the values at which the frequency is a specified number of decibels below the frequency of the mode.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data is produced by "combining" other items of data when logical or numerical operations are performed on the other items of data that yield an item of data of the same type. For example, numbers indicating distance can be combined by adding, by calculating the mean or average, by selecting one of the distances, by taking the square root of the sum of squares, or by another similar operation.

Data is produced "randomly or pseudorandomly" when it is produced by a technique that provides data indicating numbers that, over a sufficiently large group of numbers, are evenly distributed across a range. A "random number" is a number that is produced randomly or pseudorandomly. Unless the context requires otherwise, the word "random" includes both random and pseudorandom.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A character "has a typeface" when it has an appearance that is characteristic of a typeface. For example, Helvetica and Avant Garde are examples of typefaces that a character could have. Each typeface may include several variations, such as plain, bold, and italic. Within a typeface, a character also "has a point size," meaning that it has an appearance that is characteristic of a point size for the typeface, although the character may be scaled independently of point size. Each combination of typeface and point size can have a respective identifier, or can be identified by a pair of identifiers, one identifying typeface and the other point size. The term "font" is sometimes used as a synonym for "typeface."

A "text" is an arrangement of one or more lines of characters; the characters of a text may form words. Characters in a text have "a dominant typeface" when a majority of the characters have the typeface. The "skew" or "skew direction" of lines of characters in a text or other lines in an image means the direction in which the lines extend, typically measured as an angle from a reference direction such as horizontal.

An "array of data" or "data array" or "array" is a combination of items of data that can be mapped into an array. A "two-dimensional array" is a data array whose items of data can be mapped into an array having two dimensions.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of light. An image may include characters, words, and text as well as other items such as graphics. A text may be included in a set of one or more images, such as in images of the pages of a document.

An image may be divided into "segments," each of which is itself an image. A segment of an image may be of any size up to and including the whole image.

Data "defines" an image when the data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

Data is produced by "applying a criterion" to other data when the produced data indicates whether the other data meets the criterion. An operation that applies a criterion produces such data.

A criterion can be "applied" to a location in an image by applying the criterion to data defining the image in a manner that depends on the location. For example, if the image data includes a respective data item for each location, the criterion could depend on a value indicated by a location's data item or it could depend on the values indicated by the respective data items of a set of locations having a relationship to the location. A location "meets a criterion" if application of the criterion to the location produces data indicating that the location meets the criterion.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the neighboring criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A set of pixels in an image is "connected" if each pixel has at least one neighboring pixel that is in the set and if each pair of pixels in the set are connected by a subset of other pixels in the set. A connected set of pixels bounded by an edge may be called a "connected component" or "blob," and these terms may also be applied to more than one connected sets of pixels that are grouped for image analysis. In an image of text, connected components "form" text when the edges of the connected components generally follow the outlines of the parts of the text; if a text includes strokes, characters, or lines of characters, for example, connected components forming the text would have edges that generally follow the outlines of the strokes, characters, or lines of characters. Instances may occur in which a character includes more than one connected component and in which a connected component includes parts of two or more characters.

An "image characteristic" or "characteristic" is a measurable attribute of an image. An operation can "measure" a characteristic by producing data indicating the characteristic using data defining an image.

A characteristic is measured "for an image" if the characteristic is measured in a manner that is likely to produce approximately the same result each time it occurs.

A "profile" is data defining a characteristic as a function of a variable. For example, a profile may include data indicating a value of the characteristic for each of a number of directions. If the characteristic is a distribution of distances, the profile may include an average or other indication of the distribution of distances at each of the directions. An operation "compares" profiles by producing data indicating a measure of similarity or difference between the profiles. An operation "clusters" profiles by producing data indicating, for each profile, an equivalence class into which it falls, all of the profiles falling in the same equivalence class being similar and profiles in different equivalence classes being different.

A "version" of a first image is a second image produced using data defining the first image. The second image may be identical to the first image, or it may be modified by loss of resolution, by changing the data defining the first image, or by other processes that result in a modified version.

An "image input device" is a device that can receive an image and provide a signal defining a version of the image. A "scanner" is an image input device that receives an image by a scanning operation, such as by scanning a document.

An "image output device" is a device that can receive a signal defining an image and provide the image as output. A "display" is an image output device that provides the output image in human viewable form.

B. General Features

Figure 1B:
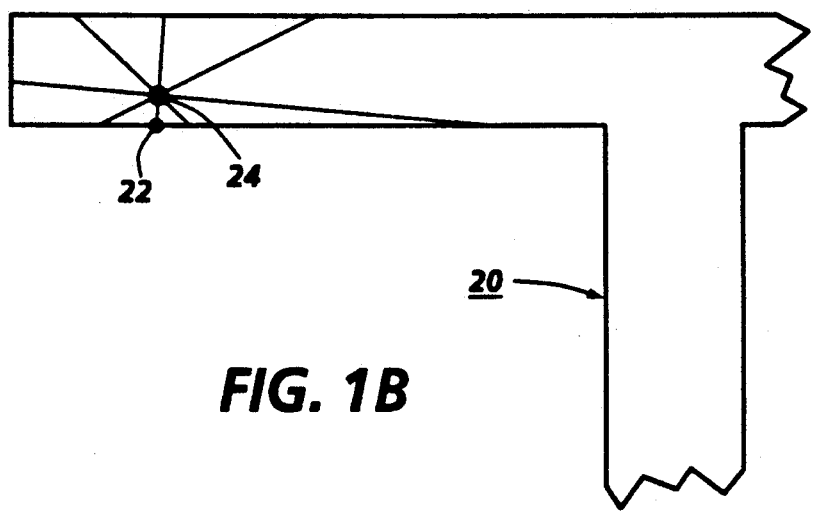
Figure 1C:
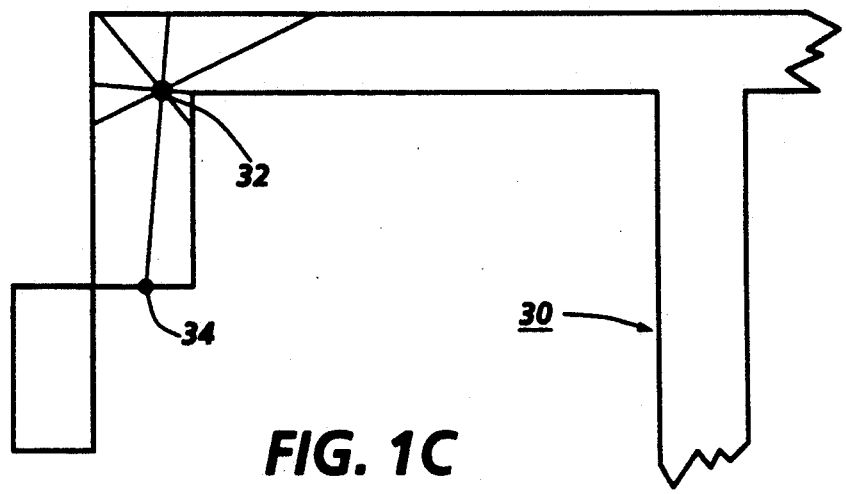
Figure 2:
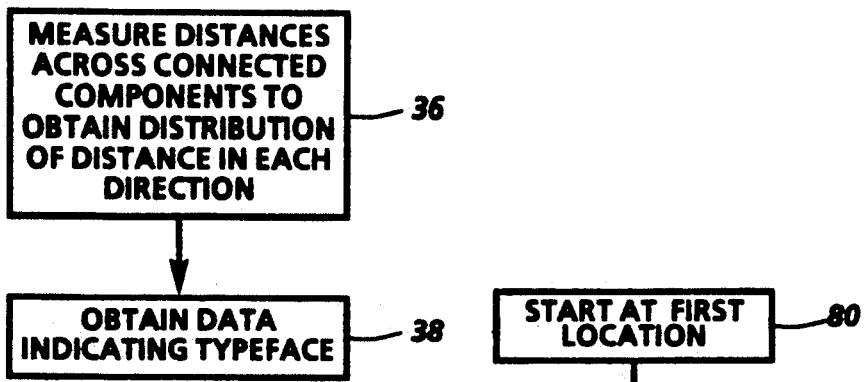
FIG. 2 is a flowchart showing general steps in obtaining data indicating dominant typeface according to the invention.
Figure 3:
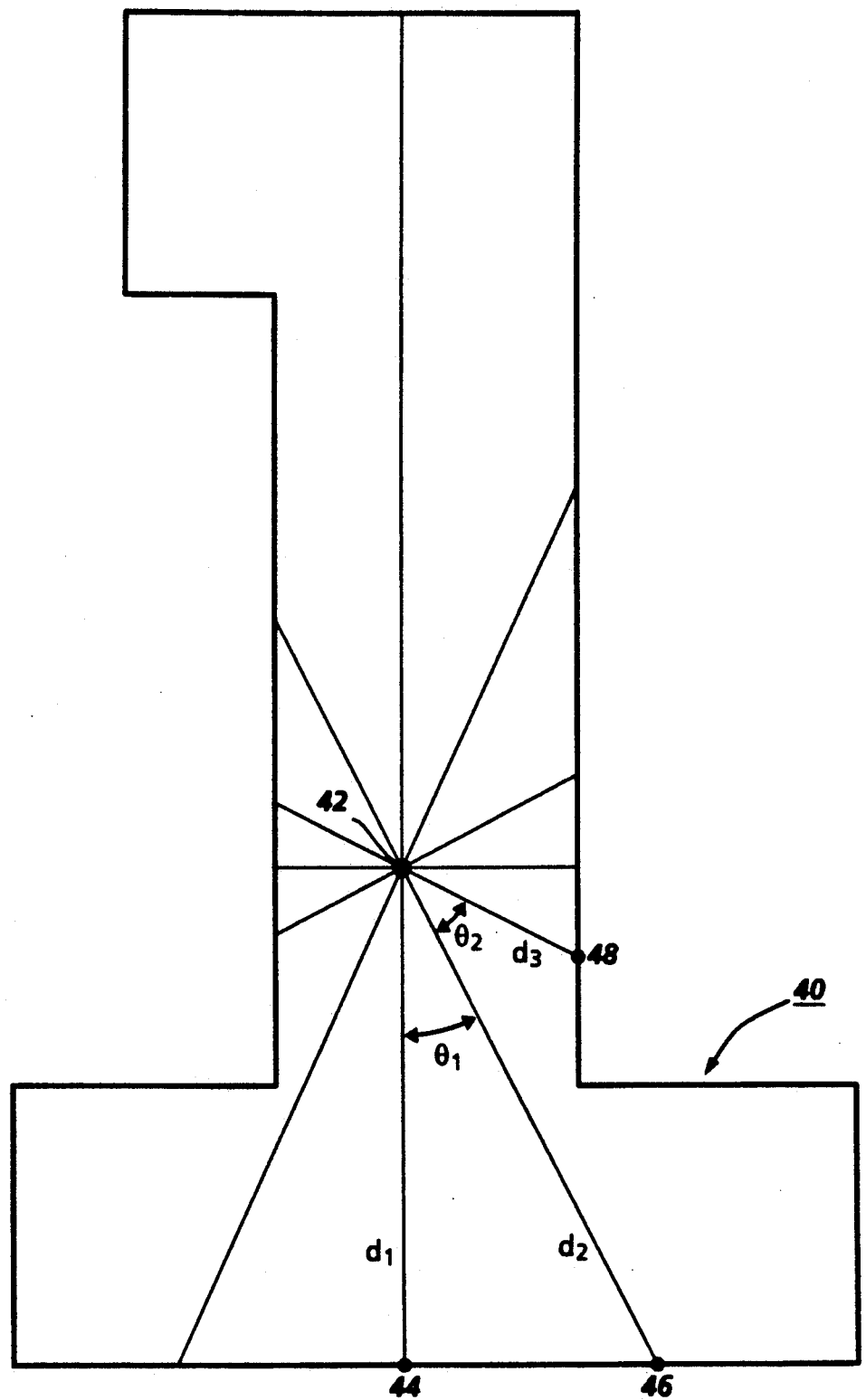
FIG. 3 is a schematic view of part of an image with distance measurements made across a connected component.
Figure 4:
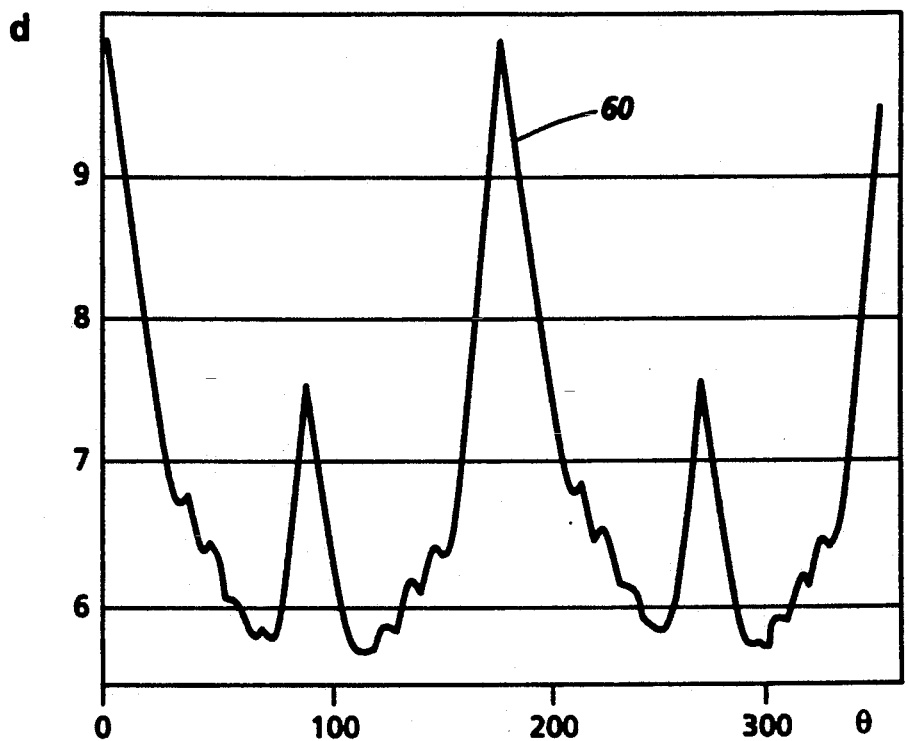
FIG. 4 is a graph showing distance as a function of direction, from which data indicating dominant typeface can be obtained.
Figure 5:
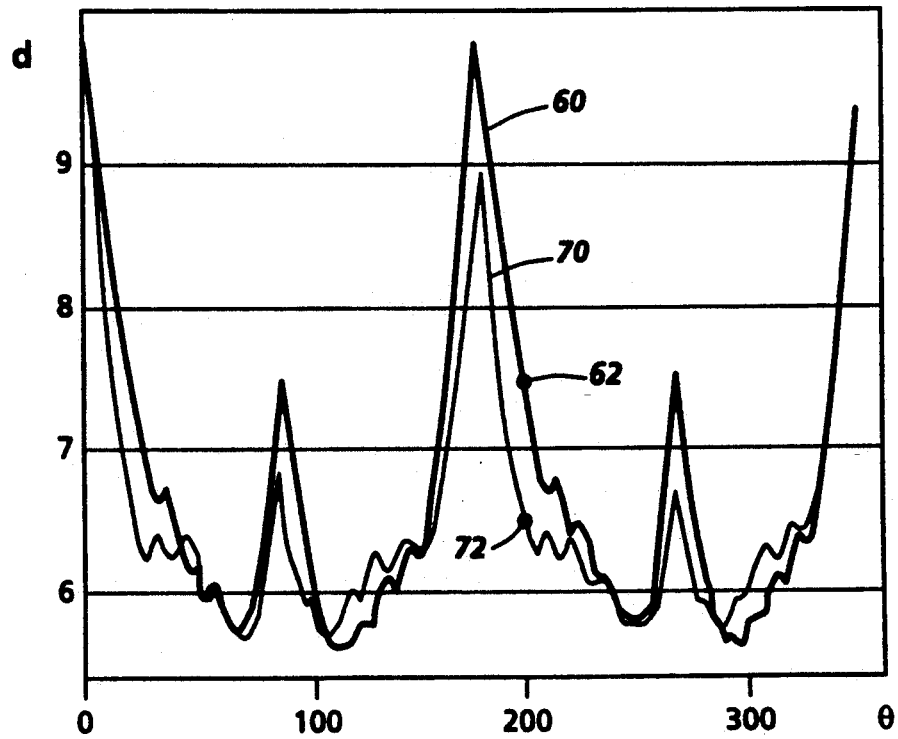
FIG. 5 shows how two graphs of distance as a function of direction for different typefaces may be compared.

FIGS. 1 through 5 illustrate general features of the invention. FIGS. 1A, 1B, and 1C show measurements taken from a location in a similar portion of a character in different typefaces. FIG. 2 is a flowchart showing general steps in obtaining data indicating dominant typeface. FIG. 3 shows an image with distance measurements made inside a connected component. FIG. 4 shows a profile based on measurements like those in FIG. 3 from which data indicating dominant typeface can be obtained. FIG. 5 shows how the profiles of different typefaces may be compared.

FIGS. 1A, 1B, and 1C show how different dominant typefaces may be detected. FIGS. 1A, 1B, and 1C show the same portion of a text character "T" in different typefaces. FIG. 1A shows typeface Quartz. FIG. 1B shows typeface Helvetica. FIG. 1C shows typeface Classic. Measurements made from a similar position in the character will produce different distances across connected components in different typefaces. For example, points 12, 24, and 32 are each in a similar position in the characters 10, 20, and 30, respectively. The distance from point 12 to point 14 is much longer that the distance from point 24 to point 22, but shorter than the distance from point 32 to 34, even though each measurement is made in a similar direction.

Typeface differences like those shown in FIGS. 1A, 1B, and 1C may explain why distance measurements can be used to obtain data indicating dominant typeface. FIG. 2 shows general steps in doing so.

In the flowchart of FIG. 2, the step in box 36 measures distances across connected components in an image of text in each of a number of directions. The distances are used to obtain distribution data indicating a distribution of distances across connected components in each direction for the image. The distribution data is used by the step in box 38 to obtain typeface data indicating the dominant typeface of characters in the image. FIG. 3 shows connected component 40 in which distance measurements can be made from a starting location to various locations that meet an edge criterion, depending on the direction from the starting location. Starting location 42 is located within connected component 40. From location 42, a first distance $d_1$ is measured along a line at a first direction to location 44 where the line meets an edge. A second distance, $d_2$, is measured along a line at a second direction separated by an angle of $\theta_1$ from the first direction to location 46 where the line meets an edge. Distance $d_3$ to location 48 is measured along a line at a third direction separated from the second direction by an angle of $\theta_2$.

The measurements can continue in this way around starting location 42 to cover a range of 360°. These measurements may be taken according to the techniques described in copending, coassigned U.S. patent application Ser. No. 07/737,957 entitled "Image Processing Using Distance as a Function of Direction," incorporated herein by reference. If each $\theta_i$ is sufficiently small, the measurements of distance capture information about details of character shape. For example, the angles of separation can have equal values, $\theta_i = (360°)/n$, where n, the number of directions that are measured, is sufficiently large to capture detailed information.

FIG. 4 shows a profile of distribution data based on distance measurements as shown in FIG. 3. Measurements made at several locations in the image can be combined to produce profile 60 by obtaining, for each direction shown on the horizontal axis, data indicating the distribution of distance measurements in the direction. The profile of distances from a black pixel across black pixels to the nearest edge pixel in each of a large number of directions is highly informative about typeface. When the distribution data at each direction is used to form a combined profile for an image, the profile indicates typeface features. For example, if the distribution data in each direction is an average of distances measured in that direction, the height of the tallest peak corresponds to the average length of vertical strokes of characters, and small humps on either side of the peak may indicate the presence of serifs. Furthermore, if the characters in the image have a dominant typeface, the profile indicates the dominant typeface.

FIG. 5 shows how profiles of different typefaces produce profiles with different characteristics. Profile 60, from FIG. 3, is a profile of text of Bookman typeface. Profile 70 is obtained from a second image of text of Avant Garde typeface. Points in the profiles may be compared to obtain data about the difference of the two profiles. Point 62 on profile 60 indicates the distribution data at a direction of about 200° from the direction of lines of text in the first image. Point 72 on profile 70 indicates the distribution data for the second image in the same direction. The difference between points 62 and 72 can be stored, and combined with information about the difference of other points on the profiles to indicate characteristics of the image such as typeface and point size.

Figure 6:
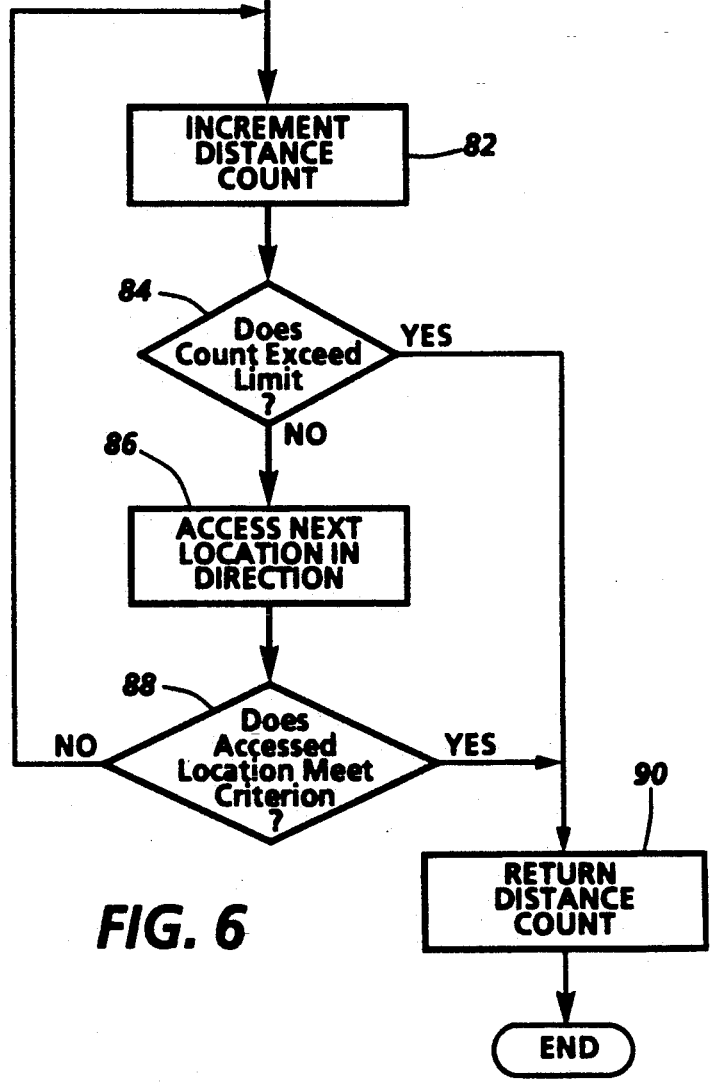
FIG. 6 is a flowchart showing steps in measuring distance from a starting location to an ending location.
Figure 7:
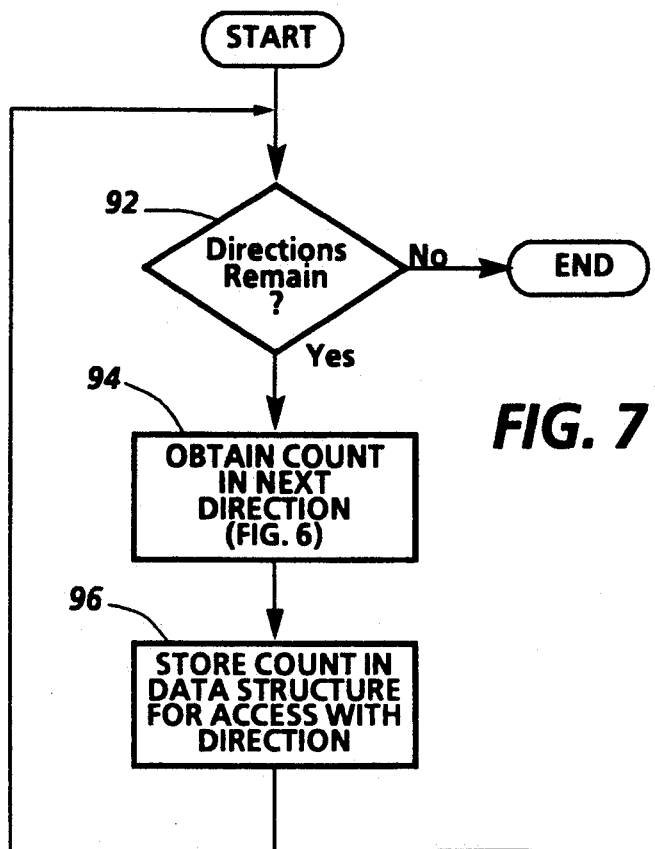
FIG. 7 is a flowchart showing steps in storing the distance data as obtained in FIG. 6.
Figure 8:
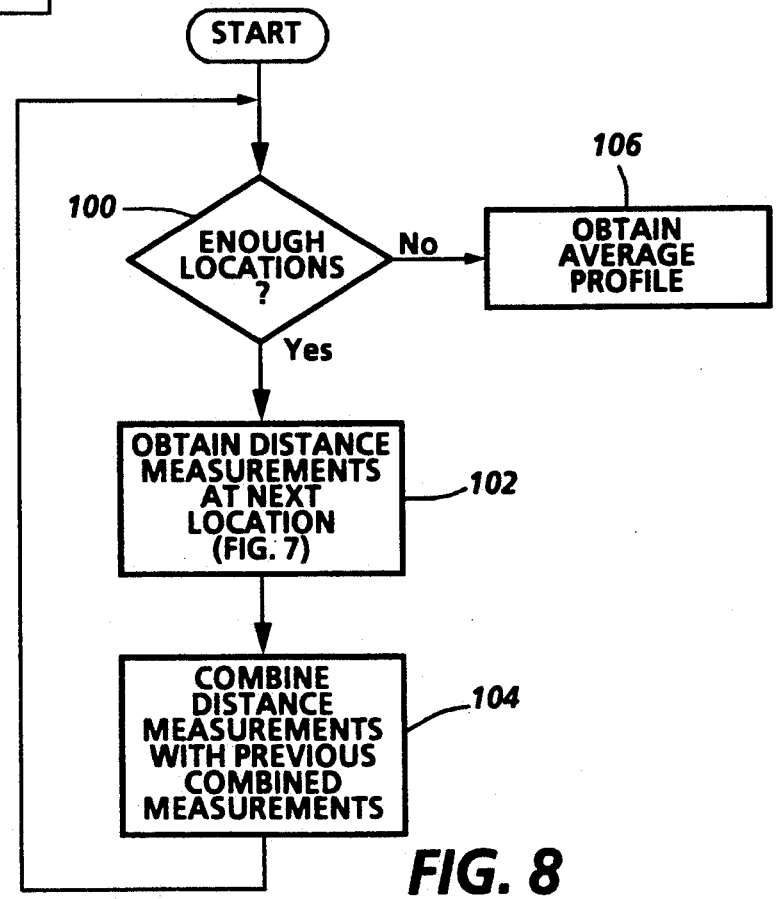
FIG. 8 is a flowchart showing steps in obtaining an average profile for an image using distance data stored as in FIG. 7.

The flowcharts of FIGS. 6, 7, and 8 show a method that can be used to obtain a profile like that shown in FIG. 4. The flowchart of FIG. 6 shows steps in measuring distance from a starting location to an ending location that meets a criterion. The flowchart of FIG. 7 shows steps in storing distance data from FIG. 6 in a data structure. The flowchart of FIG. 8 shows steps in obtaining an average profile for an image from the distance data of FIG. 7.

FIG. 6 shows steps in obtaining data indicating the distance along a line in a direction from a first location to the nearest location along the line meeting a criterion. The step in box 80 starts at the first location. The step in box 81 resets a distance count. The step in box 82 increments the distance count. The test in box 84 determines whether the distance count exceeds a limit. The value of the distance limit could be set to be three or four times the size of the largest expected character. This reduces the influence of non-character connected components, like graphics, that are substantially larger than a character. If the distance limit is not exceeded, the step in box 86 accesses data defining the next location along the line. The step in box 88 then tests whether the accessed location meets the criterion.

If the accessed location does not meet the criterion, another iteration begins with the step in box 82. Iterations continue until a location is found that meets the criterion in box 88, or the distance count exceeds the distance limit in box 84. For example, if the criterion is a white pixel, the step of box 88 would test whether the next location is a white pixel, and iterations would continue until a white pixel is found or the distance limit is exceeded. At that point, the step in box 90 returns the distance count, which indicates either the distance to the nearest white pixel or the distance limit. FIG. 7 shows general steps in storing distance data for a starting location in a data structure. The step in box 92 begins an iterative loop that handles each of a number of directions. At each iteration, the step in box 94 obtains a distance count in the next direction, following the steps in FIG. 6. Then the step in box 96 stores the distance count in a data structure in memory so that the count for each direction can be accessed with the direction for which it was obtained. When distances in all directions have been measured, the distance data structure for the location is complete, and may then be either used or stored.

FIG. 8 shows steps in combining distance data for a plurality of selected locations in an image to obtain a profile of distance as a function of direction for the image that includes the locations. Factors useful in determining an appropriate number of locations are described in copending, coassigned U.S. patent application Ser. No. 07/737,956, entitled "Image Analysis Based on Location Sampling," incorporated herein by reference.

The step in box 100 begins an iterative loop that handles each of a number of locations. Distance measurements are obtained for the next location in the step in box 102, such as by following the steps in FIG. 7 to produce a distance data structure. The step of box 104 combines the distance measurements with previously combined distance measurements, such as by adding the distances indicated by distance data in each direction. If distance measurements have been obtained and combined for enough locations, the profile of average distance, or "average profile," is obtained in the step in box 106, such as by dividing the added distances in each direction by the number of distance measurements in the direction.

The steps in boxes 104 and 106 can be allocated differently. For example, the distance data of all the locations could be obtained and stored, omitting step 104 entirely, and then the step in box 106 could obtain the average profile directly from the distance data of individual locations. Also, the combined profile that results from the last iteration of box 104 could be used directly, without averaging, so that the step in box 106 is optional. The choice of how to implement these steps can depend on efficiency or other practical considerations.

Figure 9:
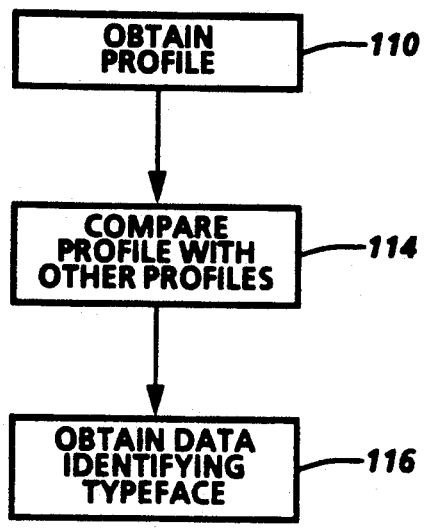
FIG. 9 is a flowchart showing steps in obtaining data identifying dominant typeface.

FIG. 9 shows steps in obtaining data identifying dominant typeface. The step in box 110 obtains a profile for an image that includes text having a dominant typeface. The profile may be obtained using a technique similar to that shown in FIG. 8 or using another technique that generates a profile indicating the dominant typeface. The step in box 114 compares the profile with other profiles. The other profiles may be profiles of known typefaces, with each having a known typeface and a known point size. The step in box 116 uses the result of the comparisons in box 114 to obtain data identifying the dominant typeface of the text in the image.

Figure 10:
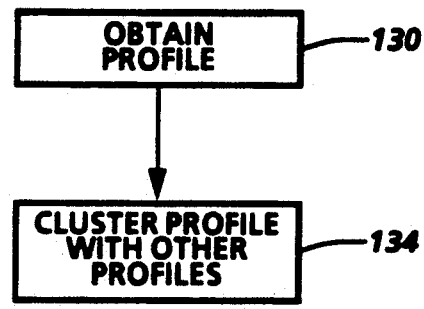
FIG. 10 is a flowchart showing steps in clustering an image profile with other profiles.

FIG. 10 shows steps in clustering an image profile with other profiles. The step in box 130 obtains a profile for an image that includes text having a dominant typeface. The profile may be obtained using a technique similar to that shown in FIG. 8 or using another technique that generates a profile indicating the dominant typeface. The step in box 134 clusters the profile with other profiles based on characteristics of the profiles.

Figure 11:
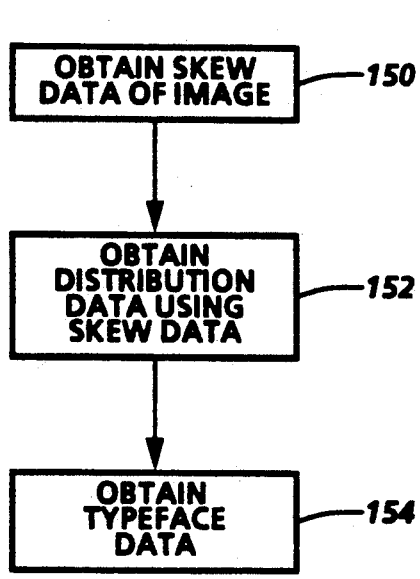
FIG. 11 is a flowchart showing steps in obtaining the dominant typeface of an image using information about skew.

FIG. 11 shows steps in obtaining data indicating the dominant typeface of an image using information about skew. If skew of the image is not taken into consideration, the profile of the image may be shifted, making comparison with other profiles difficult.

The step in box 150 obtains skew data indicating the skew of lines of text in an image. The skew may be measured using the techniques described in copending, coassigned U.S. patent application Ser. No. 07/737,863, now continued as application Ser. No. 08/043,135 entitled "Coarse and Fine Skew Measurement," incorporated herein by reference.

The step in box 152 uses the skew data in obtaining distribution data. This may be done by correcting the page orientation to deskew the image before measuring distances across connected components, or by shifting the angles at which distances are measured to compensate for the skew. The step in box 154 can obtain data indicating dominant typeface in a manner similar to FIG. 9.

Figure 12:
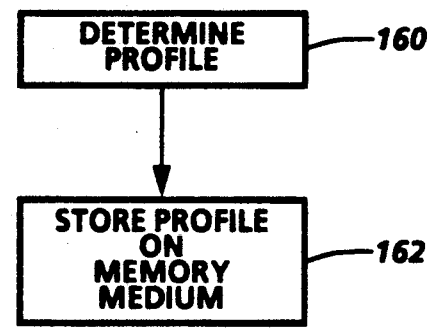
FIG. 12 is a flow chart showing general steps in storing a profile from FIG. 8 on a storage medium.
Figure 13:
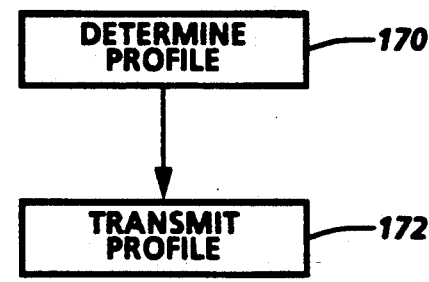
FIG. 13 is a flow chart showing general steps in transmitting a profile from FIG. 8.

FIGS. 12 and 13 show steps in using a profile indicating the dominant typeface of an image obtained by the steps in FIG. 8. FIG. 12 illustrates that the profile obtained in the step of box 160 can be stored on a memory medium by the step in box 162. This memory medium could be a rigid disk, floppy disk, ROM, CD-ROM, RAM, or any other suitable memory medium.

In FIG. 13, the profile obtained in the step of box 170 is transmitted by the step in box 172 over a transmission medium, such as a network, a telephone line, a radio link, or other suitable medium.

C. Implementations

The general features described above could be implemented in numerous ways on various machines to obtain typeface data indicating dominant typeface.

Figure 14:
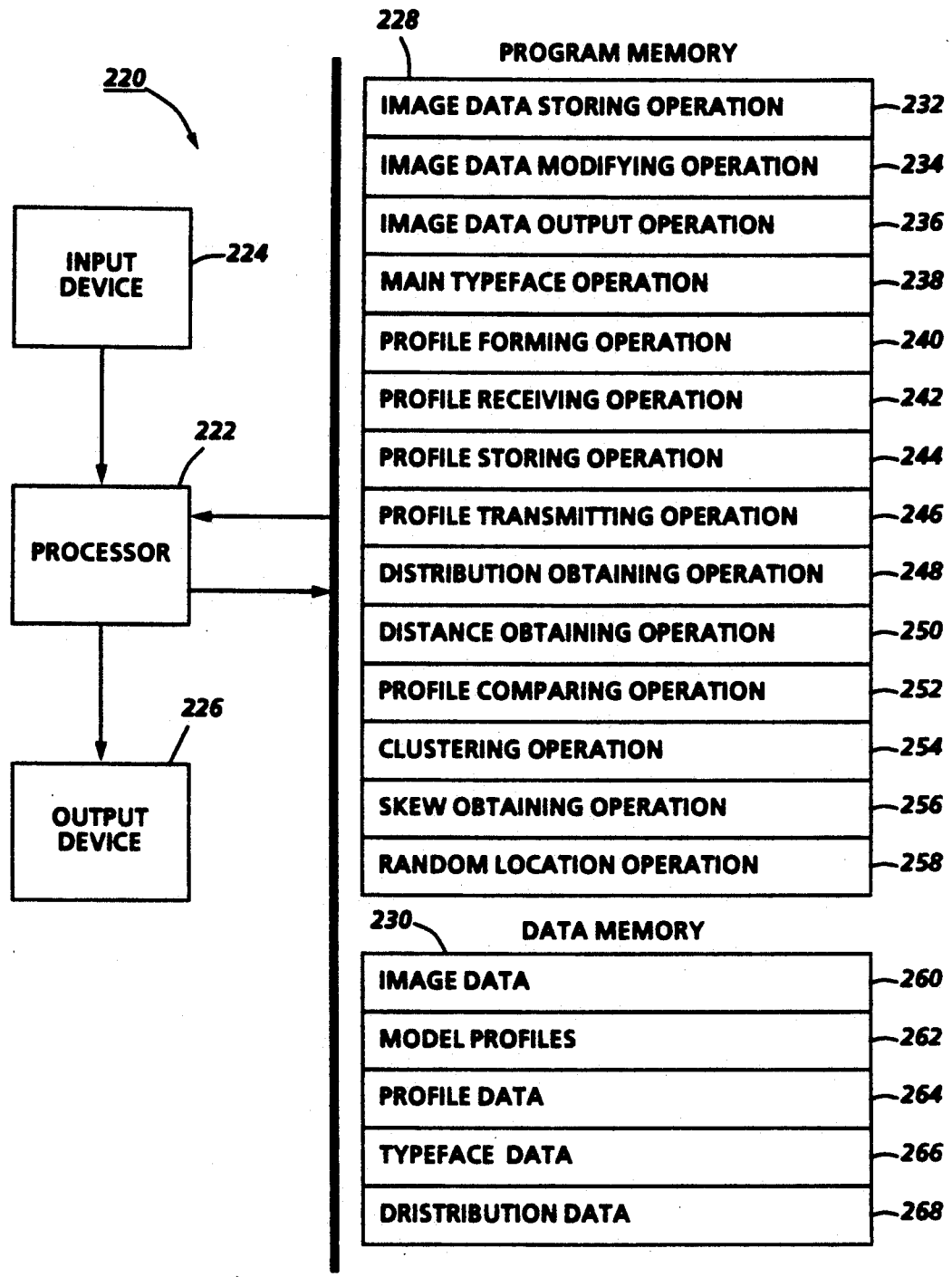
FIG. 14 is a schematic block diagram of a system in which the invention is implemented on a serial machine.

FIG. 14 shows system 220 in which the invention is implemented on a serial machine. Processor 222 is connected for receiving input data from input device 224 and for providing output data to output device 226. Processor 222 can be the CPU of a workstation, and input device 224 and output device 226 can be I/O devices. For example, input device 224 can be an image input device such as a scanner of a digital image source. Also input device 224 can provide a connection to a peripheral storage device or other storage or transmission medium from which model profiles that indicate distance as a function of direction can be received. Similarly, output device 226 can be a device for providing data obtained by processor 222, such as data indicating a dominant typeface or a profile that indicates distance as a function of direction in an image, to a storage or transmission medium.

During operation, processor 222 executes instructions from program memory 228 and accesses data memory 230 to read and write data. Program memory 228 stores instructions for various operations of processor 222.

Data memory 230 stores data structures as shown and can also temporarily store intermediate data used by processor 222 in performing its operations.

Image data storing operation 232 receives image data through input device 224 and stores it in data memory 230, and image data modifying operation 234 modifies image data 260. Similarly, image data output operation 236 provides image data 260 to output device 226.

The main typeface operation 238 identifies the dominant typeface of text in an image and obtains typeface data 266. Main typeface operation 238 may call profile forming operation 240, profile receiving operation 242, profile storing operation 244, and profile transmitting operation 246. Profile forming operation 240 obtains data defining a profile and stores the data in profile data 264. Profile receiving operation 242 receives data defining a profile from input device 224 and stores the received profile in model profiles 262. Profile storing operation 244 stores data defining a profile from profile data 264 onto a memory medium through output device 226. Profile transmitting operation 246 transmits data defining a profile from profile data 264 through output device 226.

Distribution obtaining operation 248 may be called by profile forming operation 240 to obtain distribution data 268. Distance obtaining operation 250 may be called by distribution obtaining operation 248 or by skew obtaining operation 256 to measure distance in a direction in the image defined by image data 260.

Profile comparing operation 252 may be called by main typeface operation 238 to compare a profile defined by data in profile data 264 with other profiles from profile data 264 or from model profiles 262. Profile clustering operation 254 may be called by main typeface operation 238 to cluster profiles in profile data 264 to find profiles having similar characteristics.

Skew obtaining operation 256 may be called by main typeface operation 238 to obtain skew data indicating the skew of lines of text in an image; the skew data may be used in obtaining typeface data. Random location operation 258 may be called by distribution obtaining operation 248 to obtain starting locations from which distance obtaining operation 250 measures distance.

Image data 260 in data memory 230 include data indicating a value for each pixel of an image. Image data 260 can be stored by image data storing operation 232. Model profiles 262 include data defining profiles of model images, such as images of text with known typeface and point size, and may be accessed by profile receiving operation 242 or profile comparing operation 252 as described above.

Profile data 264 include data defining profiles stored by profile forming routine 240 as described above. Profile data 264 may also be accessed by profile storing operation 244, profile transmitting operation 246, profile comparing operation 252, or clustering operation 254, as described above. Typeface data 266 include data indicating or identifying dominant typeface as determined by main typeface operation 238 as described above.

Distribution obtaining operation 248 stores distribution data 268 as described above.

Figures 15, 18, 20:
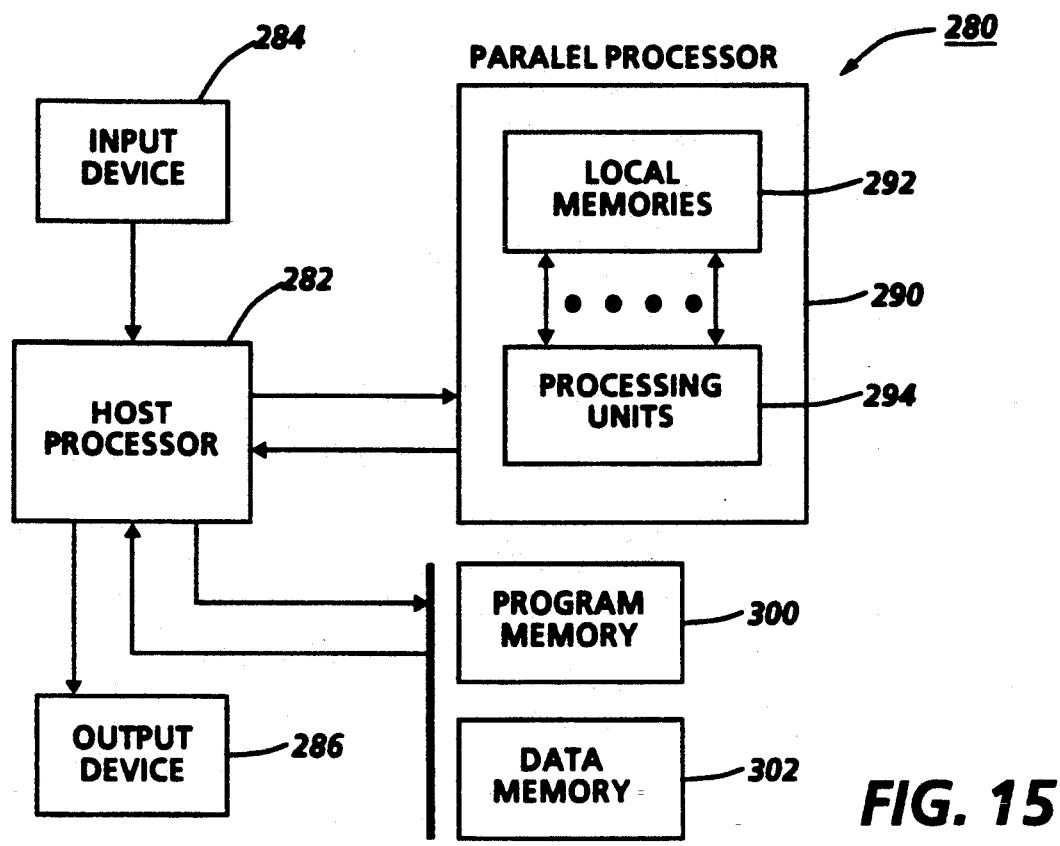
FIG. 15 is a schematic block diagram of a system in which the invention is implemented on a parallel machine.
FIG. 18 is a sample of an image of text in Bookman typeface style.
FIG. 20 is a sample of an image of text of Avant Garde typeface style.

System 280 in FIG. 15 resembles system 220 in FIG. 14. System 280 includes host processor 282 connected to receive data from input device 284 and to provide data to output device 286. Host processor 282 is also connected to exchange data with parallel processor 290, which could, for example, be a Connection Machine from Thinking Machines Corporation. Parallel processor 290 includes processing units 294, each with local memory 292. Data defining an image can be stored in local memory 292 so that each pixel's value is stored in a respective processing unit's local memory. Each processing unit can store the respective value of one or more pixels in its local memory. Host processor 282 executes instructions from program memory 300 and accesses data memory 302 in performing image processing, as described above in relation to FIG. 14. Host processor 282 performs operations that include operating each pixel's respective processing unit in parallel to obtain distance data for use in obtaining typeface data indicating dominant typeface.

Figure 16A:
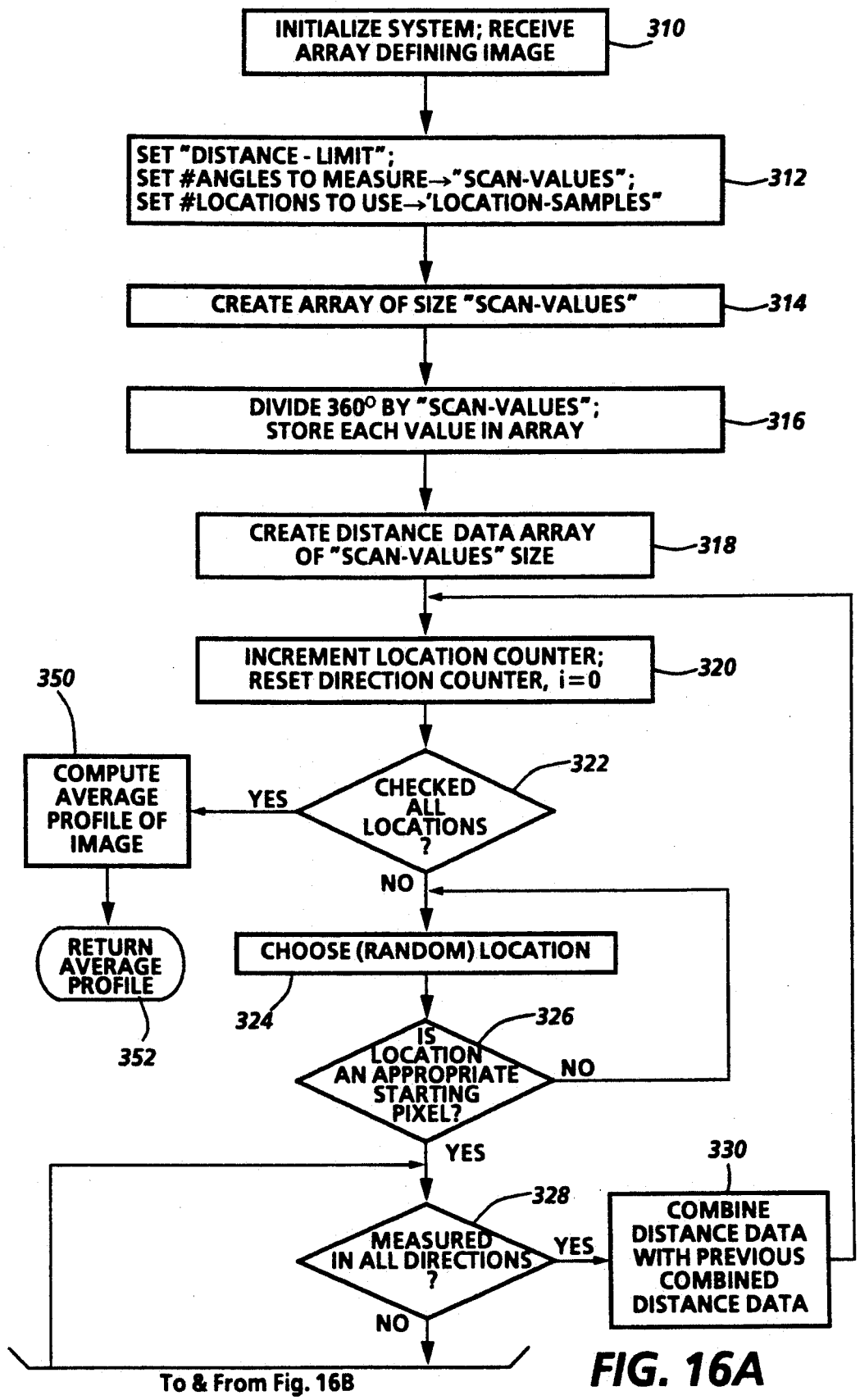
FIG. 16 is a flow chart of steps in producing a profile of distance as a function of direction.
Figure 16B:
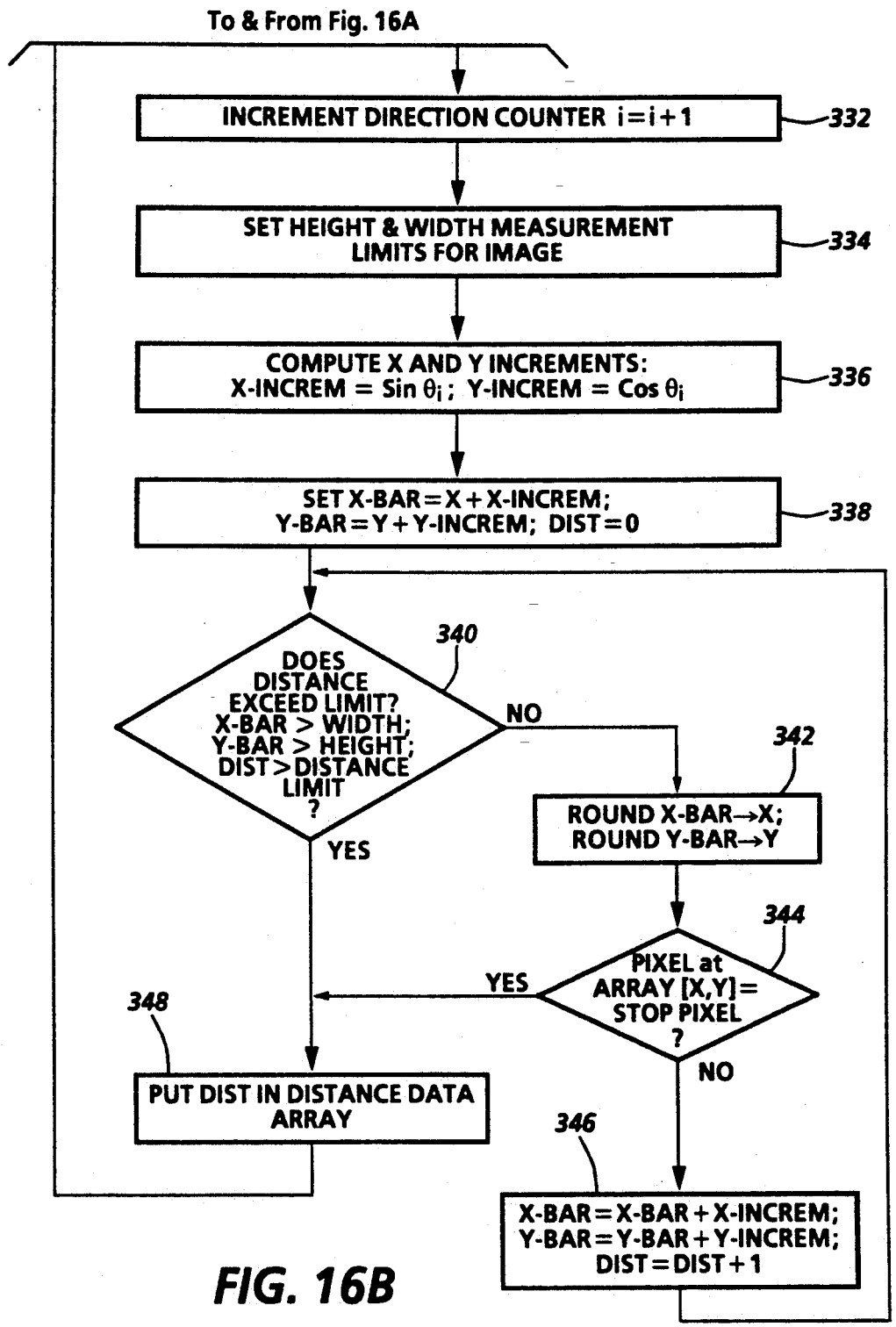
Figure 17:
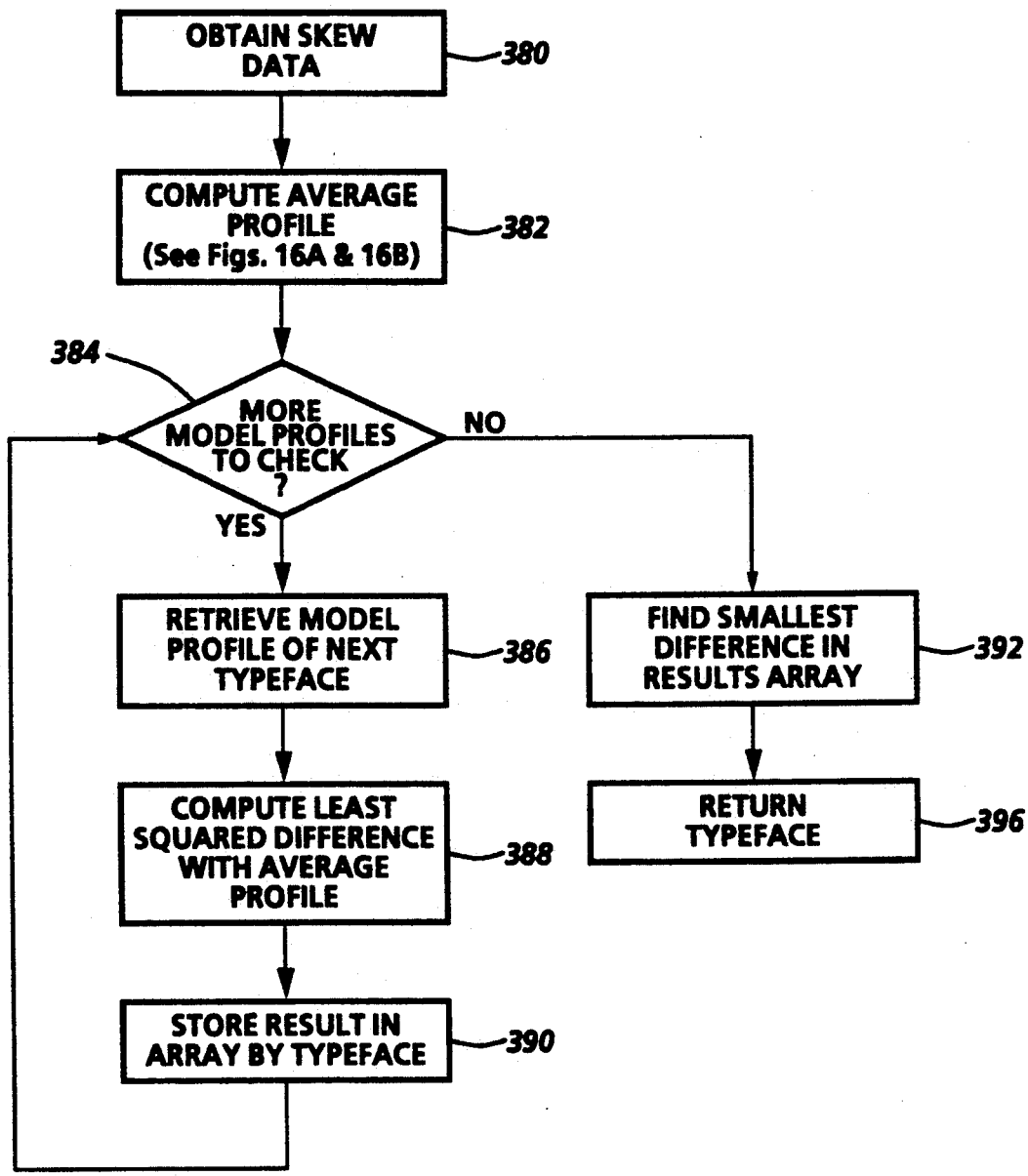
FIG. 17 is a flowchart of steps using the average profile to determine the dominant typeface of the text in the image.

FIGS. 16A, 16B, and 17 show operations that could be performed by system 22 of FIG. 14. FIGS. 16A and 16B shows an operation that produces an average distance as a function of direction profile that indicates dominant typeface of text in an image. FIG. 17 shows an operation that uses the average profile to determine the dominant typeface of text in an image.

The step in box 310 in FIG. 16A initializes the system and loads the image array which defines the image to be analyzed. If the image data is obtained in a different format than appropriate for the steps being performed, such as in a disk file format or a scanner output format, this step must convert it into an array or other appropriate format. The step in box 312 sets constants, including distance-limit; scan-values, indicating the number of directions to be used; and location-samples, indicating the number of locations to be used in characterizing the image.

The constant distance-limit may be set to a value sufficiently greater than the interline spacing of the image. For example, in one set of images the technique has worked well with distance-limit set to 70.

Because the directions are obtained by dividing 360° by scan-values, a larger value for scan-values detects image characteristics with greater resolution. Satisfactory resolution has been obtained for typeface identification with scan-values set to values from around 60 to around 120.

Satisfactory results have been obtained with location-samples set to 3000. Greater values for location-samples require more computation but may not achieve greater accuracy, once an appropriate level of statistical significance has been reached. The resolution of the image received and the particular characteristic being measured may affect the value required to obtain satisfactory measurements. Factors useful in determining an appropriate value for location-samples are described in copending, coassigned U.S. Patent Application Ser. No. 07/737,956, entitled "Image Analysis Based on Location Sampling," incorporated herein by reference.

Appropriate values of scan-values and location-samples may be determined experimentally or by statistical analysis. In general, a satisfactory value for a given measurement on a given image can be obtained by increasing each of these constants until further increase does not improve reliability of results.

The step in box 314 creates an array with scan-values size. This array will be used to store the scan directions of a segmented circle. To obtain the scan directions, the step in box 316 divides the value of the circle, 360°, by scan-values. Each direction can be stored in the array as an angle offset from some direction such as vertical down (i.e., 0° = ↓ ).

The step in box 318 creates another array, the distance data array. This array also has a size of scan-values, and will be used to store the distance measurements for each direction.

The step in box 320 resets the direction counter to zero, and increments the location counter to keep track of the number of locations sampled. The step in box 322 checks for when the location counter reaches location-samples.

If the desired number of locations have not yet been sampled, the step in box 324 chooses another location. This may be a random or pseudo-random choice. Factors useful in determining an appropriate starting location are described in copending, coassigned U.S. Patent Application Ser. No. 07/737,956, entitled "Image Analysis Based on Location Sampling," incorporated herein by reference. The step of box 326 checks to make sure that the location is an appropriate choice for a starting pixel. For typeface identification, the starting pixel should be of the same value as the pixels within connected components, typically black. The technique of FIGS. 16A, 16B and 17 identifies dominant typeface satisfactorily if each starting pixel is any black pixel or if each starting pixel is any black edge pixel.

If the chosen pixel does not have the desired properties, no measurements are made from the pixel and the system returns to box 324 to obtain another location. If the pixel is an appropriate starting location, the step in box 328 begins an iterative loop that handles scan-values directions. For each iteration, the step in box 332 increments the direction counter to indicate a new direction. The step in box 334 sets limits for the height and width of the image array for the chosen pixel. These may indicate the outside edges of the image, so that measurements need not be taken beyond the edges of the image. The step in box 336 computes respective increments along the x and y axes for each increment along a line in the new direction. The step in box 338 starts the variables x-bar and y-bar at the first increment from the starting pixel along this line and resets the distance count dist.

The step in box 340 begins an iterative loop by checking whether the length from the starting pixel is beyond any of the width, height or distance limits. If it is not, the current values of x-bar and y-bar are rounded to integers in order to access data defining a pixel in the image array. The step of box 344 checks to see if the pixel meets a criterion for stopping; for example, to measure distance across a black connected component, the stop criterion can be a white pixel. If the pixel does not meet the stop criterion, the step in box 346 increments x-bar, y-bar, and dist, and returns to box 340 to check for the limits for the next location. If the pixel meets the stop criterion, distance data dist indicating length from the starting pixel is stored in the distance data array by the step in box 348. The system then returns to box 328 until distance has been measured for scan-values directions.

If distance has been measured in all directions, the distance data is combined with previous distance data in box 330 by obtaining data indicating the sum of the distance in each direction to the sums of previous distances in that direction, and the location counter is incremented in box 320. If location-samples locations have been sampled at the step in box 322, the step in box 350 obtains distribution data for each direction by dividing the total distance in the direction by the number of locations. This distribution data is used to form a profile of average distance as a function of direction for the image. The average profile is returned in the step in box 352.

FIG. 17 shows an operation that uses the average profile to determine the typeface of text in an image. The step in box 380 obtains skew data indicating the skew of lines of text in the image, which can be taken into account in later computations or can be used to deskew the image. Skew may be measured with the techniques described in copending, coassigned U.S. patent application Ser. No. 07/737,863, now continued as application Ser. No. 08/043,135 entitled "Coarse and Fine Skew Measurement," incorporated herein by reference. The step in box 382 computes a new average profile for the image, as described above in relation to FIGS. 16A and 16B.

Box 384 begins an iterative loop that compares the profile from box 382 with each of a number of model profiles for known typefaces. The step in box 386 retrieves the next model profile for comparison. The step in box 388 computes the sum-of-squares difference between the model profile and the average profile from box 382. This can be done using the formula:

$$\min_{x \in R} {}^{i=\text{scan-values}}_{\underset{i=0}{\Sigma}} (a(i) - b(i) - x)^2$$

to obtain a sum of squares, of which the square root could then be obtained as a measure of difference between the model profile and the current average profile. Other standard comparison techniques could be used, such as obtaining a difference in absolute values or any other conventional measure of distance. The sum-of-squares difference method corrects for small degradations in copy quality, such as a thickening or thinning of characters without bleeding or breaking, where the primary effect on the profile is a uniform shift up or down.

The difference from box 388 is stored in the step in box 390 in a result array in a location accessible using the model profile's typeface. If there are no more model profiles to check in box 384, the step in box 392 find the smallest difference in the results array. An identifier of the typeface with the smallest difference is returned in the step in box 396.

Figure 19:
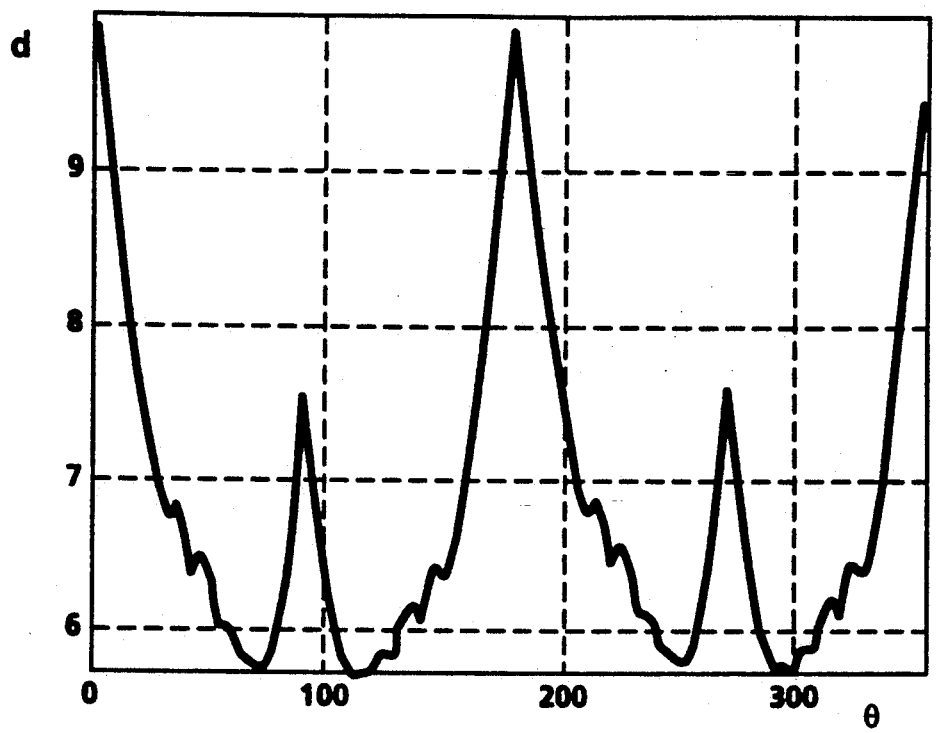
FIG. 19 is a profile of distance as a function of direction for the image of FIG. 18.
Figure 21:
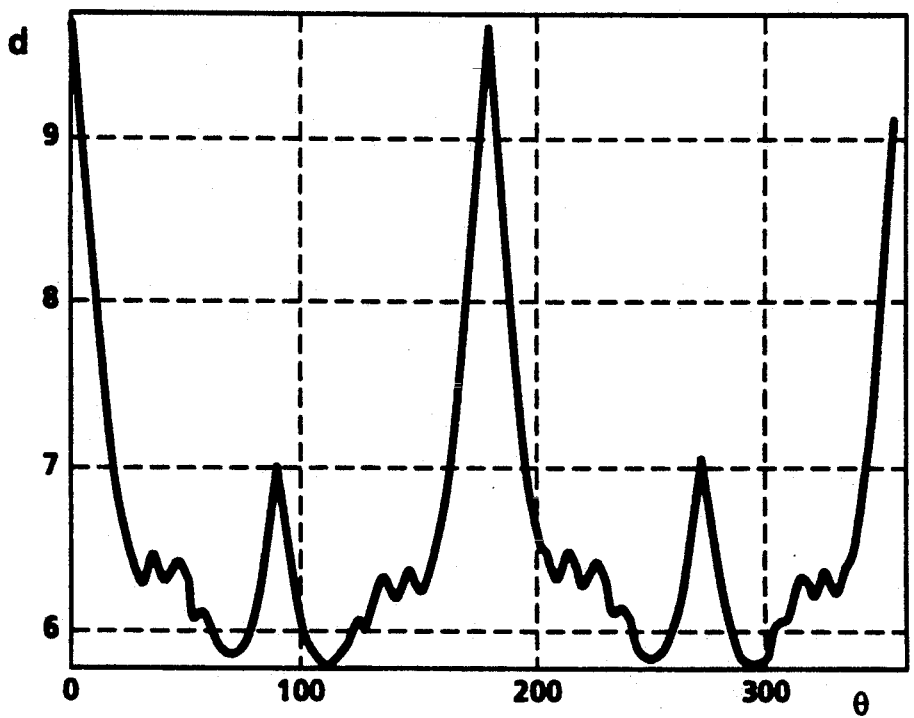
FIG. 21 is a profile of distance as a function of direction for the image of FIG. 20.

FIGS. 18–21 show examples using the technique of FIGS. 16A and 16B. In each case, a profile of average distance as a function of direction is obtained using the technique of FIGS. 16A and 16B on a sample of text. FIG. 18 shows an example of Bookman typeface. FIG. 19 is a plot of a profile for Bookman typeface, obtained using the technique of FIGS. 16A and 16B. FIG. 20 shows a sample of text in Avant Garde typeface and FIG. 21 shows a plot of a profile for Avant Garde typeface, also obtained using the technique of FIGS. 16A and 16B.

D. Experimental Results

Figures 22, 23, 24:
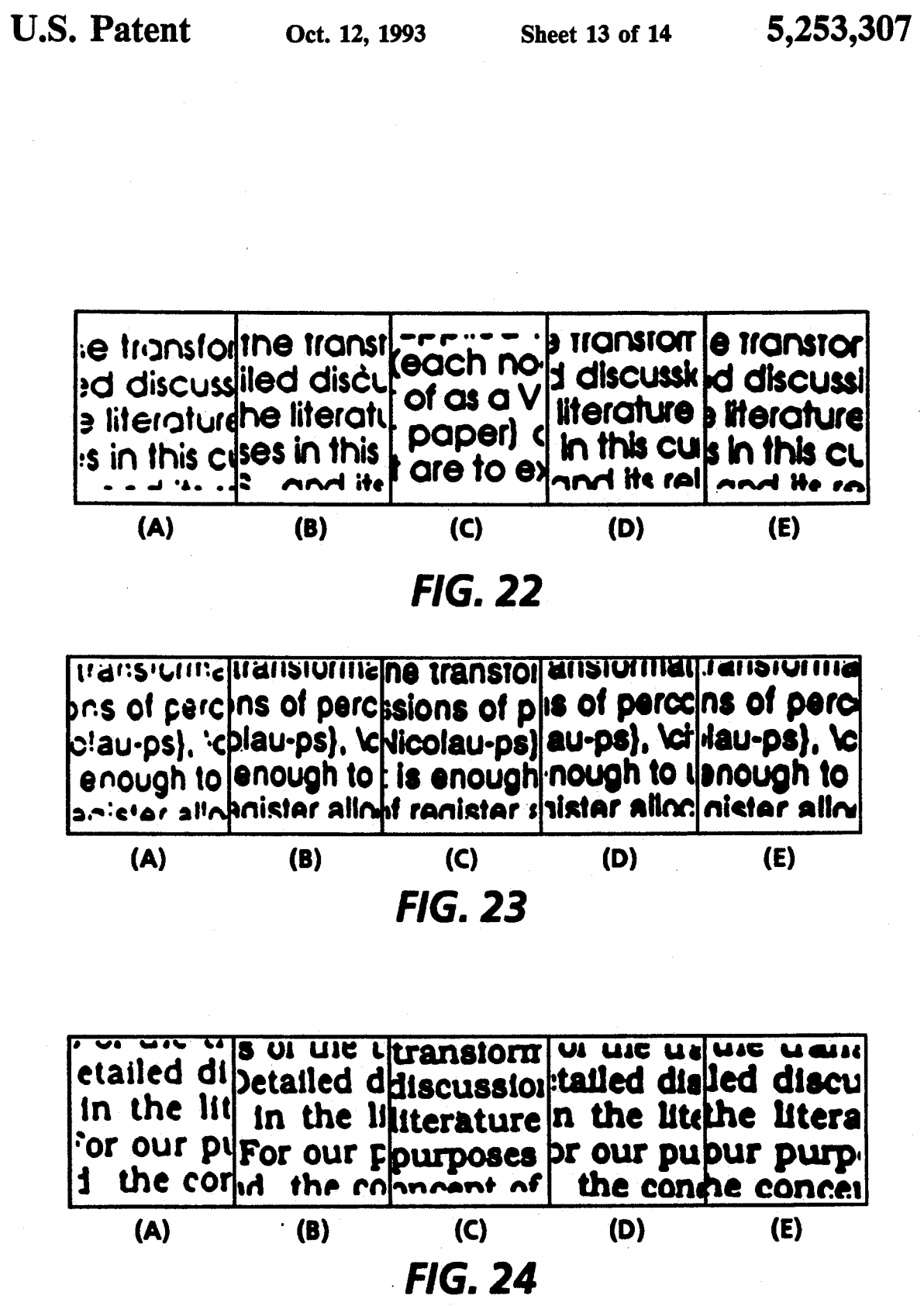
Figure 25:
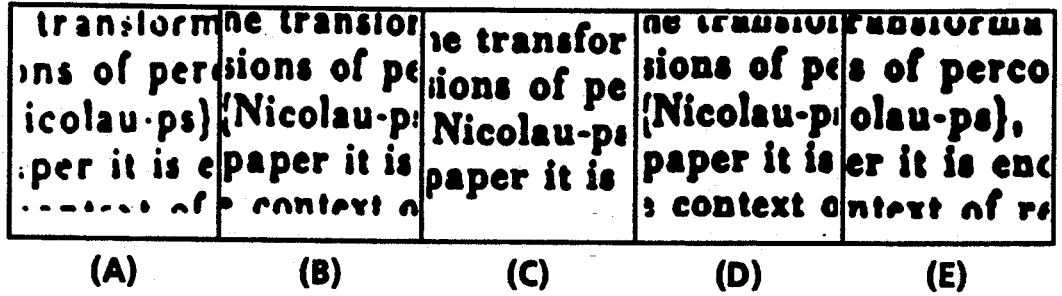
FIGS. 25A, 25B, 25C, 25D, and 25E each are a sample of an image of text of Bodoni typeface with a varying degree of degradation.
Figure 26:
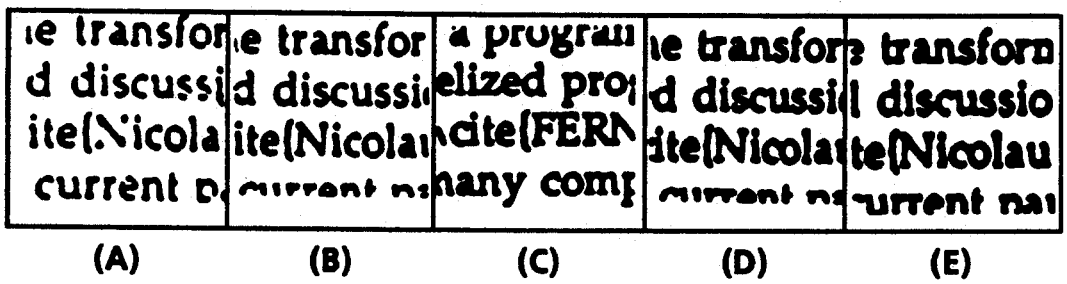
FIGS. 26A, 26B, 26C, 26D, and 26E each are a sample of an image of text of Palatino typeface with a varying degree of degradation.

FIGS. 22–26 show examples of five different typefaces, in 12 point typeface at 300 dots per inch. Two of the typefaces are sans serif. FIG. 22 shows text in Avant Garde typeface. FIG. 23 shows text in Helvetica typeface. Three of the typefaces are serif. FIG. 24 shows text in Bookman typeface. FIG. 25 shows text in Bodoni typeface. FIG. 26 shows text in Palatino typeface. Model profiles were computed for each typeface using all the black pixels in a single scanned page of the typeface. These models were tried on thirty samples of text.

FIGS. 22–26 each show five samples of text in the respective typeface with various levels of degradation. Sample (C) in each figure shows the typeface in "normal" condition. Sample (B) shows a "light" version, made by photocopying the original two times using a light setting. Sample (A) shows a "very light" version, made by photocopying the original four times using a light setting. Sample (D) shows a "dark" version, made by photocopying the original two times using a dark setting. Sample (E) shows a "very dark" version, made by photocopying the original four times using a dark setting.

The technique of FIGS. 16A, 16B, and 17 was applied to six samples (except in one case, where it was applied to five samples) of each typeface: two "normal", one "light", one "very light", one "dark", and one "very dark." Several experimental conditions were tried. The technique was applied using 60, 90, and 120 directions for scan-values, and with 2500, 5000, and 10,000 black pixels sampled as location-samples. The tables below show how many times samples of each typeface were classified as each known typeface. For example, in Table 1 Avant Garde typeface was correctly classified all six times when tested using 60 directions at 2500, 5000, and 10,000 samples. Samples in Helvetica typeface when tested using 60 directions were correctly identified two times when the test included 2500 and 5000 samples and three times when the test included 10,000 samples.

Table 1 shows the result of running the method using 60 scan-values. The three sets of numbers show results when location-samples were taken at 2500, 5000, and 10,000 pixels, respectively.

Table 2 shows the result of running the method using 90 scan-values. The three sets of numbers show results when location-samples were taken at 2500, 5000, and 10,000 pixels, respectively. The technique was applied to only five samples at 5000 pixels, with only one "normal" sample.

TABLE 1

|             | Avant Garde | Helvetica | Bookman | Bodoni | Palatino |
|-------------|-------------|-----------|---------|--------|----------|
| Avant Garde | 6,6,6       |           |         |        |          |
| Helvetica   | 3,3,2       | 2,2,3     |         | 0,1,1  | 1,0,0    |
| Bookman     |             |           | 4,4,3   |        | 2,2,3    |
| Bodoni      |             |           |         | 5,5,5  | 1,1,1    |
| Palatino    |             |           |         |        | 6,6,6    |

TABLE 2

|             | Avant Garde | Helvetica | Bookman | Bodoni | Palatino |
|-------------|-------------|-----------|---------|--------|----------|
| Avant Garde | 6,5,6       |           |         |        |          |
| Helvetica   | 3,2,2       | 3,2,3     |         |        | 0,1,1    |
| Bookman     |             |           | 2,3,4   | 2,0,1  | 2,2,1    |
| Bodoni      |             |           |         | 5,4,5  | 1,1,1    |
| Palatino    | 0,1,1       |           |         |        | 6,4,5    |

Table 3 shows the result of running the method using 120 scan-values. The three sets of numbers show results when location-samples were taken at 2500, 5000, and 10,000 pixels, respectively.

TABLE 3

|             | Avant Garde | Helvetica | Bookman | Bodoni | Palatino |
|-------------|-------------|-----------|---------|--------|----------|
| Avant Garde | 6,6,6       |           |         |        |          |
| Helvetica   | 2,1,2       | 3,4,3     |         | 1,0,0  | 0,1,1    |
| Bookman     |             |           | 4,2,4   | 0,1,0  | 2,3,2    |
| Bodoni      |             |           |         | 5,5,5  | 1,1,1    |
| Palatino    | 1,0,1       |           |         |        | 5,6,5    |

It should be noted that almost all the misclassifications were for degraded quality images—"very light," "light," "dark," or "very dark." None of the "normal" samples was incorrectly classified when sampling 10,000 pixels. A number of the classification errors occur on data of very poor quality, such that even a human observer would have a hard time recognizing typeface.

E. Applications

Figure 27:
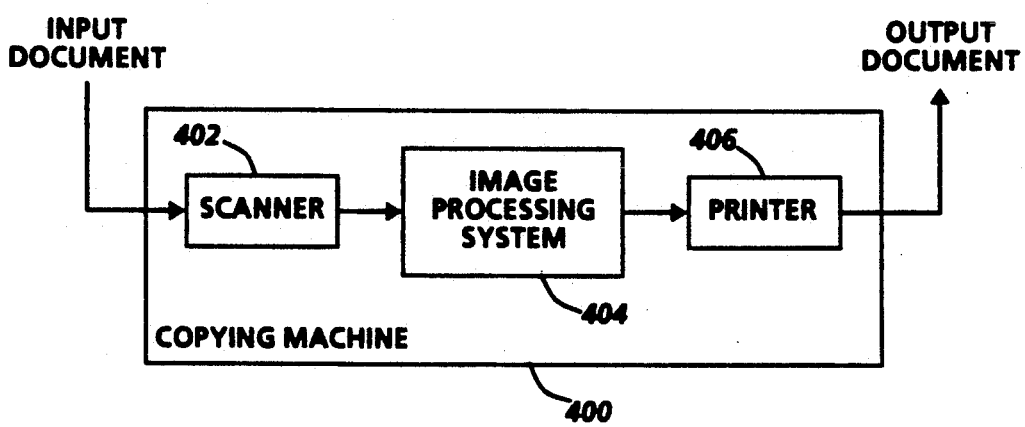
FIG. 27 illustrates an application of the invention in a copying machine.

The invention could be applied in many ways. FIG. 27 illustrates an application of the invention in a copying machine.

In FIG. 27, copying machine 400 includes scanner 402, image processing system 404, and printer 406. Scanner 402 can produce data defining an image of an input document. Image processing system 404 can be implemented as shown in FIG. 14 or in FIG. 15, and can, in addition to identifying dominant typeface, use optical character recognition techniques to identify characters in the document. Image processing system 404 might also apply techniques to detect character size and positioning and to produce data defining a corrected image in which a character in the input document image is replaced by a correct version of the same character from the identified dominant typeface at the appropriate size, position, and skew. The data defining the corrected image could then be provided to printer 406 to print an output document.

F. Source Code Appendix

Appendix A is Common Lisp source code implementing some of the features described above. The source code in Appendix A may differ in some respects from the above description, but execution of the source code in Appendix A on a Sun-4 workstation obtains data indicating dominant typeface as described above.

The code in Appendix A, when executed, generally follows the serial implementation described above, with Appendix A generally following the techniques described in relation to FIGS. 16A, 16B, and 17. Nonetheless, the code may differ from the above description in various ways. For example, the code may be divided into procedures or routines differently than described above in relation to FIG. 14.

The following are included in Appendix A:

The function top-level-fonts is the central dispatching function. It converts a raster bit map to a histogram representing the average distance in all the directions. The parameters are set by the two variables "font-scan-values" which sets how many times the circle should be divided and "font-random-point-samples" which is the number of points which should be sampled.

The function create-random-histogram builds an average profile array over a number of points in the image.

The function hist-to-list changes and array to a list for computations.

The function build-histogram computes a profile array of distances at directions for a location.

The function scan-along-line determines that distance along a line from an edge pixel to the next black pixel.

The function initialize returns an array with values of angles computed from a range divided by the number of scan values.

The function pretty-match-list compares a histogram against model histograms in lst. It sorts and reports the results.

The function feed-pretty-sorter runs a bulk comparison of a list of histograms, and reports the results in ordered form.

The function feed-pretty-sorter2 runs a bulk comparison of a list of histograms against another list of histograms, and reports the results in ordered form.

The function least-squared-norm takes the euclidean norm of two histograms by first fitting them in a least squared sense. The input arrays are assumed to be one dimensional.

G. Miscellaneous

The invention has been described in relation to implementations in which operations are performed on data defining an image to obtain data indicating information about dominant typeface of text in the image. The invention might also be implemented with specialized circuitry connected to photosensors for directly obtaining data indicating information about dominant typeface of text in an image.

The invention has been described in relation to software implementations, but the invention might be implemented with specialized hardware.

The invention has also been described in relation to implementations in which distances are measured from randomly selected locations. The starting locations for distance measurement could alternatively be selected with some other criterion, such as all pixels interior to connected components, all pixels at edges, or every Nth interior or edge pixel. Furthermore, it might not be necessary to measure distance in each direction from a given location; instead, distance might be measured from a different set of starting locations for each direction.

The invention has been described in relation to implementations in which distance is measured across a 360° range of equally separated directions. It might be possible to use a 180° range of directions. It might also be possible to identify a set of directions that are not equally separated but that provide the necessary information to indicate dominant typeface.

The invention has been described in relation to implementations in which distribution data for each direction is obtained by averaging measured distances. Other techniques might be used to obtain distribution data. For example, other measures of central value could be obtained, such as a mode or a median. A measure of variance could be obtained, such as a standard deviation. A mixed measure of central value and variance could be obtained, such as distances at which the frequency is a number of decibels below the mode. In general, distribution data can be obtained after all distance measurements are obtained or, to reduce data storage requirements, distance measurements can be combined as they are obtained, such as by summing.

The invention has been described in relation to implementations in which data defining a profile of distribution data as a function of direction indicates dominant typeface. Other techniques might be used to obtain data indicating dominant typeface. The directions in which maxima and minima of distribution data occur, for example, might indicate dominant typeface.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

Appendix A

© Copyright 1990 Xerox Corporation    All Rights Reserved

;;; -*- Package: USER; Base: 10; Syntax: Common-Lisp -*-

;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;
;;;;;;; Font identification software......
;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;

```
;;; To use:
;;; The function "top-level-fonts" converts a raster bit map
;;; to a histogram representing the average distance in all
;;; the directions. The parameters are set by the two variables
;;; "font-scan-values" which sets how many times the circle
;;; should be divided and "font-random-point-samples" which is
;;; the number of points which should be sampled.
;;;
;;; These histograms can be compared by the host of norm functions
;;; defined in a number of different ways.
;;;
;;; Large scale over night test runs can be accomplished by using
;;; the "Test-font???" functions at the end. These run through
;;; a number of different fonts and store the histograms in
;;; a list. The latest versions store them in a list of lists
;;; of the format (("name string" histogram-array) ("name string" ...) ...)
;;; The name string is used by the sorting routines to do bulk comparisons
;;; and sorting.
;;;
;;; The bulk comparison can be done by running "feed-pretty-sorter"
;;; to compare a list of histograms against itself. It will do this
;;; and report the results in ordered form. That is "font1" matches
;;; "font2" with euclidean distance .25, "font3" with euclidean distance
;;; .73 etc.
;;;
;;; If you would like to compare one set of font histograms against
;;; another set, then use "feed-pretty-sorter2" which accepts two
;;; lists.
;;;
;;; Duplicating the previous work: I built models for the different
;;; bitmaps by running "build-models" and storing the resulting list
;;; of arrays in a variable like "models-100000-60". Then I would
;;; run the samples using "test-fonts???" and compare the two with
;;; "feed-pretty-sorter2".
;;;

(defvar font-scan-values 60)
(defvar font-random-point-samples 3000)

(defun top-level-fonts (image)
;;;This is the central dispatching function. First it tries the lowest
;;;resolution and keeps going until it finds two peaks. Then it stopss...
```

```
(let* ((ran-state (make-random-state)) ;;freezes the random state for local focusing.
       (ran-state-var (make-random-state ran-state))
       (init-array (initialize font-scan-values 0 360))
       (histo (create-random-histogram image font-random-point-samples
                                       init-array ran-state-var black-pix white-pix)))

;;;;(break)
(pprint (list "Initial angles:" font-scan-values "Points" font-random-point-samples ))
(plot::plot (hist-to-list init-array) (hist-to-list histo) :size '(370 370))
;;;   (do ((i 0 (1+ i))) ((= i font-scan-values)) (pprint (aref histo i)))
histo))

(defun least-squared-norm (arr1 arr2)
;;;Takes the euclidean norm of two histograms by first fitting them in a least
;;; squared sense.
;;; That is the square root of the sum of the squares
;;; of the differences. arr1 and arr2 assumed
;;; to be one dimensional arrays.

(let ((tot 0) (tot2 0)
      (len (min (si:decode-array arr1) (si:decode-array arr2))))
  (do ((i 0 (1+ i)))
      ((= i len))
    (setq tot (+ tot (- (aref arr1 i) (aref arr2 i)))))
  (setq tot (float (/ tot len)))
  (do ((i 0 (1+ i)))
      ((= i len))
    (setq tot2 (+ tot2 (square (- (aref arr1 i) (+ tot (aref arr2 i)))))))

;;;   (print (list (float (aref arr1 i)) (float (aref arr2 i)) (float (square (- (aref arr1 i) (aref arr2 i))))))
  )
  (sqrt tot2)))

(defun pretty-match-list (font lst)
;;; Compares font against everything in lst. Sorts and reports the results.
;;; Note, it assumes that lst and font are pairs of (string, array) where
;;; the string is the font name.
```

```
(let* ((font-arr (cadr font))
       (lst2 (mapcar #'(lambda (a) (list (car a)
                                          (float (least-squared-norm font-arr
                                                                      (cadr a)))))
                     lst)))
  (pprint (list "Font:" (car font)))
  (pprint (sort lst2 '(lambda (a b)(< (cadr a) (cadr b))))))))

(defun feed-pretty-sorter (lst)
;;; feeds pretty match list in a nice shell.

(mapc #'(lambda (a) (pretty-match-list a lst)) lst))

(defun feed-pretty-sorter2 (lst1 lst2)
;;; feeds pretty match list in a nice shell.

(mapc #'(lambda (a) (pretty-match-list a lst1)) lst2))

(defun square (x)
  (* x x))

;;; All of these are controled by the global constants.
;;; These could be parameterized.

(zl:defvar white-pix 0) ;;; Be careful about these settings.
(zl:defvar black-pix 1)
(zl:defvar boundary 70) ; This is the maximum distance the scan-along-line function may go.
(zl:defvar scan-values 24) ; The number of directions scanned.
(zl:defvar direction-array nil) ;Eventually this will be the array holding the angles.
(zl:defvar precise-scan-values 30) ; Used when the algorithm locks in on a valley.
(zl:defvar random-point-samples 3000); The number of times to check.
(zl:defvar valley-threshold .1) ; The percentage where the valley begins.
(zl:defvar ceiling-threshold .4) ;;; This is the location of the ceiling. Used to
 ;;; Calculate the distances between lines.

;;;
;;; The function in here "build-histogram" is also used by the font identification
;;; routines. It is parameterized by the stop and start pixels.
;;;; The skew routine uses a black start and a black stop pixel.
```

;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
;;;;;;;;;;;; Main Code for building histogram
;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;

```
(defun initialize (scan-values begin end)
;Get everything rolling....
;;;Returns an array with the circle divided up into
;;; scan-value slices begining with the very beginning
;;; and continuing until the last end. Used in the code
;;; to set the angles.

(let ((direction-array (make-array scan-values)))
    (if (< end begin) (setq end (+ 360 end)))

(do ((i 0 (1+ i)) (increm (/ (- end begin) scan-values)))
        ((= i scan-values))
      (setf (aref direction-array i) (mod (+ begin (* i increm)) 360)))
    direction-array))

(defun hist-to-list (arr)
  (let ((answer nil))
    (do ((i 0 (1+ i)) (max (si:decode-array arr)))
        ((= max i))
      (push (aref arr i) answer))
    (reverse answer)))

(defun scan-along-line (arr x y angle stop-pix)
;Scans along a line defined by the angle until it finds a white
;pixel. Then it keeps going until it finds a pixel equal to stop
;;pixel.
  (multiple-value-bind (width height ignore) (decode-raster-array arr)
;;;
;;; Set up the increments. Take care of infinities and divide by zeros.
;;;

(setq width (1- width))
    (setq height (1- height))
    (let* ((x-increm (sind angle)) (y-increm (cosd angle))
           (x-bar (+ x x-increm)) (y-bar (+ y y-increm)) (dist 0)

(dist-increm 1))                          ; These are for counting out the steps.
```

```
;;;     (pprint (list "--- x:" x-increm " y:" y-increm))

(cond ((not (or (>= x-bar width) (>= y-bar height) (< x-bar 0) (< y-bar 0)
                        (= (raster-aref arr (round x-bar) (round y-bar)) stop-pix)))

(do ((stopp nil))
                    ;; Start becomes true at the first white-pix. Then count
                    ;; until the first black one upon which stopp becomes true.
                    ((or stopp (> dist boundary) (>= x-bar width) (>= y-bar height)
                         (< x-bar 0) (< y-bar 0)))

;;;                 (print (list stopp x-bar y-bar (raster-aref arr (round x-bar) (round y-bar))))

(if (= (raster-aref arr (round x-bar) (round y-bar)) stop-pix)
                        (setq stopp t))

(setq x-bar (+ x-bar x-increm))
                    (setq y-bar (+ y-bar y-increm))
                    (setq dist (+ dist dist-increm)))

;return the final distance.
               dist)
              (t 0)))))

(defun build-histogram (arr x y direction-array stop-color)
  ; arr is the array. (x,y) is the point for which
  ; the calling function would like to know the
  ; histogram of the distance (scan-along-line)
  ; function.

; Note that the angles to be scanned are computed
  ;; initially in the initialization function. Then (let ((answer (make-array scan-values)))

(do ((i 0 (1+ i)))
        ((= i scan-values))
      (setf (aref answer i)
            (scan-along-line arr x y (aref direction-array i) stop-color)))

answer))
```

```
(defun create-random-histogram (arr num direction-array ran-seed pick-color stop-color)
;; Takes an array, chooses a num of points at random and
;; computes the histo-gram which results. This histogram contains
;; the average distance versus theta function. I ;; pick-color is the color of the points chosen at random.
;; stop-color is the color the scanning goes through until it stops.

(multiple-value-bind (width height ignore) (decode-raster-array arr)

(let* ((ran-loco ran-seed)
          (scan-values (si:decode-array direction-array))
          (answer (make-array scan-values :initial-element 0)) (count 0)
          (normalize (make-array scan-values :initial-element 0))
          (wid (- width 2)) (hei (- height 2)))

(do ((local-answer nil)
         (x (1+ (random wid ran-loco)) (1+ (random wid ran-loco)))
         (y (1+ (random hei ran-loco)) (1+ (random hei ran-loco))))

((= count num))         ;; Count is only incremememted when (x,y) = black-pix

;;;        (pprint (list x y (raster-aref arr x y)))
        (cond ((and (= pick-color (raster-aref arr x y))
                    (or (/= pick-color (raster-aref arr (1+ x) y))  ;;; Just precludes
                        (/= pick-color (raster-aref arr (1- x) y))    ;;; edge pixels.
                        (/= pick-color (raster-aref arr x (1+ y)))
                        (/= pick-color (raster-aref arr (1+ x) (1+ y)))
                        (/= pick-color (raster-aref arr (1- x) (1+ y)))
                        (/= pick-color (raster-aref arr x (1- y)))
                        (/= pick-color (raster-aref arr (1+ x) (1- y)))
                        (/= pick-color (raster-aref arr (1- x) (1- y)))))
               (setq local-answer (build-histogram arr x y direction-array stop-color))
               ;;         (print-hist local-answer)
               (do ((j 0 (1+ j)))
                   ((= j scan-values))
                 (setf (aref answer j) (+ (aref answer j) (aref local-answer j)))
                 (if (< 0 (aref local-answer j))
                     (setf (aref normalize j) (1+ (aref normalize j)))))

(setq count (1+ count)))))
    (do ((j 0 (1+ j)))
        ((= j scan-values))
;;;     (print (list "answer" (aref answer j) "count" (aref normalize j)))
```

```
       (if (< 0 (aref normalize j))
           (setf (aref answer j) (/ (aref answer j) (aref normalize j)))
           (setf (aref answer j) 0)))
     answer)))

;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;
;;;;;; For producing the test histogram-arrays...
;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;

(defun test-fonts-old ()
  (let ((list-o-font-histo nil))

(setq font-random-point-samples 3000)
    (setq font-scan-values 72)

(pprint "Avant-Guard")
    (push (top-level-fonts avant-guard) list-o-font-histo)
    (pprint "Bodini")
    (push (top-level-fonts bodini) list-o-font-histo)
    (pprint "Bookman")
    (push (top-level-fonts bookman) list-o-font-histo)
    (pprint "Times ")
    (push (top-level-fonts times1) list-o-font-histo)
    (pprint "Times-Capitals")
    (push (top-level-fonts times-cap) list-o-font-histo)
    (pprint "Times Double Spaced")
    (push (top-level-fonts times-double) list-o-font-histo)
    (pprint "Revue")
    (push (top-level-fonts revue) list-o-font-histo)
    (pprint "Garamond")
    (push (top-level-fonts garamond) list-o-font-histo)
    (pprint "helvetica")
    (push (top-level-fonts helvetica) list-o-font-histo)
    (pprint "C L Helvetica")
    (push (top-level-fonts cl-helvetica) list-o-font-histo)
    (pprint "Freestyle Script")
    (push (top-level-fonts freestyle-script) list-o-font-histo)
```

```
(pprint "P Bodini Poster")
(push (top-level-fonts p-bodini-poster) list-o-font-histo)
(pprint "University Roman")
(push (top-level-fonts university-roman) list-o-font-histo)

(pprint "New York")
(push (top-level-fonts new-york) list-o-font-histo)

(compute-norm-table list-o-font-histo list-o-font-histo)))

(defun test-fonts213 ()
 (let ((list-o-font-histo nil))

(setq font-random-point-samples 1500)
  (setq font-scan-values 60)

(pprint "Avant-Guard")
  (push (list "Avant-Guard" (top-level-fonts avant-guard)) list-o-font-histo)
  (clean-random)
  (pprint "Bodini")
  (push (list "Bodini" (top-level-fonts bodini)) list-o-font-histo)
  (clean-random)
  (pprint "Bookman")
  (push (list "Bookman" (top-level-fonts bookman)) list-o-font-histo)
  (clean-random)
  (pprint "Times ")
  (push (list "Times" (top-level-fonts times1)) list-o-font-histo)
  (clean-random)
  (pprint "Avant-Guard")
  (push (list "Avant-Guard2" (top-level-fonts avant-guard)) list-o-font-histo)
  (clean-random)
  (pprint "Bodini")
  (push (list "Bodini" (top-level-fonts bodini)) list-o-font-histo)
  (clean-random)
  (pprint "Bookman")
  (push (list "Bookman" (top-level-fonts bookman)) list-o-font-histo)
  (clean-random)
  (pprint "Times ")
  (push (list "Times2" (top-level-fonts times1)) list-o-font-histo)
  (clean-random)
```

```
(pprint "Times-12-1")
(push (list "Times-12-1" (top-level-fonts Times-12-1)) list-o-font-histo)
(clean-random)

(pprint "Times-12-2")
(push (list "Times-12-2" (top-level-fonts Times-12-2)) list-o-font-histo)
(clean-random)

(pprint "Times-12-3")
(push (list "Times-12-3" (top-level-fonts Times-12-3)) list-o-font-histo)
(clean-random)

(pprint "Times-24-1")
(push (list "Times-24-1" (top-level-fonts Times-24-1)) list-o-font-histo)
(clean-random)

(pprint "Times-24-2")
(push (list "Times-24-2" (top-level-fonts Times-24-2)) list-o-font-histo)
(clean-random)

(pprint "Times-24-3")
(push (list "Times-24-3" (top-level-fonts Times-24-3)) list-o-font-histo)
(clean-random)

(pprint "Helvetica-12-1")
(push (list "Helvetica-12-1" (top-level-fonts helvetica-12-1)) list-o-font-histo)
(clean-random)

(pprint "Helvetica-12-2")
(push (list "Helvetica-12-2" (top-level-fonts helvetica-12-2)) list-o-font-histo)
(clean-random)

(pprint "Helvetica-12-3")
(push (list "Helvetica-12-3" (top-level-fonts helvetica-12-3)) list-o-font-histo)
(clean-random)

(pprint "Helvetica-24-1")
(push (list "Helvetica-24-1" (top-level-fonts helvetica-24-1)) list-o-font-histo)
(clean-random)

(pprint "Helvetica-24-2")
(push (list "Helvetica-24-2" (top-level-fonts helvetica-24-2)) list-o-font-histo)
(clean-random)
```

```
   (pprint "Helvetica-24-3")
   (push (list "Helvetica-24-3" (top-level-fonts helvetica-24-3)) list-o-font-histo)
   (clean-random)

(pprint "Bodini-12-1")
   (push (list "Bodini-12-1" (top-level-fonts bodini-12-1)) list-o-font-histo)
   (clean-random)

(pprint "Bodini-12-2")
   (push (list "Bodini-12-2" (top-level-fonts bodini-12-2)) list-o-font-histo)
   (clean-random)

(pprint "Bodini-12-3")
   (push (list "Bodini-12-3" (top-level-fonts bodini-12-3)) list-o-font-histo)
   (clean-random)

(reverse list-o-font-histo )))

(defun test-new-fonts ()
  (let ((list-o-font-histo nil))

(setq font-random-point-samples 3000)
   (setq font-scan-values 72)

(pprint "Times-12-1")
   (push (top-level-fonts Times-12-1) list-o-font-histo)
   (clean-random)

(pprint "Times-12-2")
   (push (top-level-fonts Times-12-2) list-o-font-histo)
   (clean-random)

(pprint "Times-12-3")
   (push (top-level-fonts Times-12-3) list-o-font-histo)
   (clean-random)

(pprint "Helvetica-12-1")
   (push (top-level-fonts helvetica-12-1) list-o-font-histo)
   (clean-random)

(pprint "Helvetica-12-2")
```

```
(push (top-level-fonts helvetica-12-2) list-o-font-histo)
(clean-random)

(pprint "Helvetica-12-3")
(push (top-level-fonts helvetica-12-3) list-o-font-histo)
(clean-random)

(pprint "Bodini-12-1")
(push (top-level-fonts bodini-12-1) list-o-font-histo)
(clean-random)

(pprint "Bodini-12-2")
(push (top-level-fonts bodini-12-2) list-o-font-histo)
(clean-random)

(pprint "Bodini-12-3")
(push (top-level-fonts bodini-12-3) list-o-font-histo)
(clean-random)

(pprint "Helvetica-24-1")
(push (top-level-fonts helvetica-24-1) list-o-font-histo)
(clean-random)

(pprint "Helvetica-24-2")
(push (top-level-fonts helvetica-24-2) list-o-font-histo)
(clean-random)

(pprint "Helvetica-24-3")
(push (top-level-fonts helvetica-24-3) list-o-font-histo)
(clean-random)

(print "Bodini-12-1")
(push (top-level-fonts bodini-12-1) list-o-font-histo)
(clean-random)

(print "Bodini-12-2")
(push (top-level-fonts bodini-12-2) list-o-font-histo)
(clean-random)

(print "Bodini-12-3")
(push (top-level-fonts bodini-12-3) list-o-font-histo)
(clean-random)
```

```
       (reverse list-o-font-histo)))

(defun build-models (points angles)
(let ((list-o-font-histo nil))

(setq font-random-point-samples points)
 (setq font-scan-values angles)

(pprint "Bookman Model")
 (push (list "Bookman-Model" (top-level-fonts bookman-model)) list-o-font-histo)
 (clean-random)

(pprint "Avant Guard Model")
 (push (list "Avant-Guard-Model" (top-level-fonts avant-guard-model)) list-o-font-histo)
 (clean-random)

(pprint "Palatino Model")
 (push (list "Palatino Model" (top-level-fonts palatino-model)) list-o-font-histo)
 (clean-random)

(pprint "Helvetica Model")
 (push (list "Helvetica Model" (top-level-fonts Helvetica-model)) list-o-font-histo)
 (clean-random)

(pprint "Bodini Model")
 (push (list "Bodini Model" (top-level-fonts Bodini-model)) list-o-font-histo)
 (clean-random)

(reverse list-o-font-histo)
))

;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
;;;;;;; Overnight functions for multiple runs....
;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
```

```
(defun over-night ()

(setq models-60-100000 (build-models 100000 60))
(setq models-90-100000 (build-models 100000 90))
(setq results-60-2500 (test-fonts17 2500 60))
(setq results-60-5000 (test-fonts17 5000 60)))

(defun over-night2 ()

(setq results2-60-2500 (test-fonts19 2500 60))
 (setq results2-60-5000 (test-fonts19 5000 60))
 (setq results2-90-2500 (test-fonts19 2500 90))
 (setq results2-90-5000 (test-fonts19 5000 90))
 (setq results2-120-2500 (test-fonts19 2500 120))
 (setq results2-120-5000 (test-fonts19 5000 120)))

(defun over-night3 ()

(setq results3-60-2500 (test-fonts23 2500 60))
 (setq results3-60-5000 (test-fonts23 5000 60))
 (setq results3-90-2500 (test-fonts23 2500 90))
 (setq results3-90-5000 (test-fonts23 5000 90))
 (setq results3-120-2500 (test-fonts23 2500 120))
 (setq results3-120-5000 (test-fonts23 5000 120)))

(defun over-night4 ()
 (setq results-60-10000 (test-fonts17 10000 60))
 (setq results-90-10000 (test-fonts17 10000 90))
 (setq results-120-10000 (test-fonts17 10000 120))

(setq results2-60-10000 (test-fonts19 10000 60))
 (setq results2-90-10000 (test-fonts19 10000 90))
 (setq results2-120-10000 (test-fonts19 10000 120))

(setq results3-60-10000 (test-fonts23 10000 60))
 (setq results3-90-10000 (test-fonts23 10000 90))
 (setq results3-120-10000 (test-fonts23 10000 120)))

(defun over-night5 ()

(setq results3-90-10000 (test-fonts23 10000 90))

(setq results3-120-10000 (test-fonts23 10000 120)))
```

What is claimed is:

1. A method of performing image processing on an image that includes text with characters having a dominant typeface, the image including connected components that form the text; the method comprising steps of:

measuring distances across connected components in each of a plurality of directions and using the measured distances to obtain, for each direction, distribution data indicating a distribution of distances across connected components in the direction for the image; the step of measuring distances comprising measuring distances across a plurality of connected components, each distance being measured across one of the connected components; the plurality of connected components being in a plurality of the characters in the text; and using the distribution data for the plurality of directions to obtain typeface data indicating the dominant typeface.

2. The method of claim 1 in which the plurality of directions covers a range, each direction being separated from adjacent directions by approximately the same angle so that the directions cover the range evenly.

3. The method of claim 2 in which the range is 360°.

4. The method of claim 1 in which the step of measuring distances comprises:

for each of the plurality of directions, a respective plurality of distance obtaining substeps, each of a direction's distance obtaining substeps obtaining distance data indicating distance from a respective starting location to an edge of a connected component in the direction; and for each of the plurality of directions, a respective distribution obtaining substep; each direction's distribution obtaining substep using distance data from the direction's distance obtaining substeps to obtain the direction's distribution data.

5. The method of claim 4 in which each direction's distribution obtaining step comprises a substep of combining distance data from the direction's distance obtaining substeps to obtain the direction's distribution data.

6. The method of claim 5 in which each direction's distribution data indicates a central value of the distances indicated by distance data from the direction's distance obtaining substeps.

7. The method of claim 4 in which each connected component includes locations at which the image has a first color, each of the starting locations being a location at which the image has the first color.

8. The method of claim 7 in which each connected component is surrounded by locations at which the image has a second color, each of the starting locations being adjacent to an edge between the first color and the second color.

9. The method of claim 4 in which each of the starting locations is a pixel.

10. The method of claim 1 in which the step of using the distribution data to obtain typeface data comprises a substep of operating on the distribution data of the directions together to form a profile for the image, the profile being the typeface data.

11. The method of claim 10, further comprising a step of comparing the profile for the image with a profile for another image.

12. The method of claim 11 in which the other image includes text with characters having a known typeface.

13. The method of claim 11 in which the other image includes text with characters having an unknown typeface.

14. The method of claim 11 in which the text in the image includes characters having a first size and the other image includes text with characters having a second size; the step of comparing the profile being independent of differences between the first size and the second size.

15. The method of claim 10, further comprising a step of comparing the profile for the image with each of a set of model profiles, each of the model profiles being for a respective known typeface.

16. The method of claim 15 in which the step of comparing comprises substeps of:

determining which of the model profiles is most similar to the profile for the image; and providing an identifier indicating the respective known typeface of the model profile that is most similar to the profile for the image.

17. The method of claim 16 in which each of the model profiles is for a known point size of the model profile's known typeface; the identifier further indicating the known point size of the model profile that is most similar to the profile for the image.

18. The method of claim 10, further comprising a step of clustering the profile for the image with profiles for other images.

19. The method of claim 10, further comprising a step of providing the profile for the image to a storage medium.

20. The method of claim 10, further comprising a step of providing the profile for the image to a transmission medium.

21. The method of claim 10 in which the text includes lines of characters at a skew; the method further comprising a step of obtaining skew data indicating the skew; the substep of operating on the distribution data comprising a substep of using the skew data in forming the profile for the image so that the profile is independent of the skew.

22. The method of claim 1 in which the text includes lines of characters at a skew; the method further comprising a step of obtaining skew data indicating the skew; the plurality of directions being directions relative to the skew indicated by the skew data.

23. An image processing machine comprising:

memory for storing image data defining an image that includes text with characters having a dominant typeface, the image including connected components that form the text; and a processor connected for accessing the memory, the processor comprising:

distribution obtaining means for using the image data to obtain, for each of a plurality of directions, respective distribution data indicating a distribution of distances across connected components in the direction, the distribution obtaining means obtaining each direction's distribution data by measuring distances across a plurality of connected components, each distance being measured across one of the connected components; the plurality of connected components being in a plurality of the characters in the text; and typeface obtaining means for using the distribution data for the plurality of directions to obtain typeface data indicating the dominant typeface.

24. The machine of claim 23 in which the typeface obtaining means operates on the respective distribution data of the directions together to form a profile for the image.

25. The machine of claim 24 in which the processor further comprises profile comparing means for comparing the profile for the image with a profile for another image.

26. The machine of claim 24 in which the memory comprises profile storing means for storing a set of model profiles; the processor further comprising profile comparing means for accessing the stored set of model profiles to compare the profile for the image with each of the model profiles.

27. The machine of claim 24 in which the processor further comprises clustering means for clustering the profile for the image with profiles for other images.

28. The machine of claim 24, further comprising a storage medium; the processor further comprising profile storing means for providing the profile for the image to the storage medium.

29. The machine of claim 24, further comprising a connection between the processor and a transmission medium; the processor further comprising profile transmitting means for providing the profile for the image to the transmission medium.

30. The machine of claim 24 in which the text includes lines of characters at a skew; the processor further comprising skew obtaining means for obtaining skew data indicating the skew; the profile forming means comprising means for using the skew data in forming the profile for the image so that the profile is independent of the skew.

31. The machine of claim 23 in which the machine further comprises:
   an image input device for receiving an input image and for providing input image data defining the input image; and
   an image output device for receiving output image data defining an output image and for providing the output image;
   the processor further comprising:
   image data storing means for storing the input image data from the image input device in the memory;
   image data modifying means for modifying the image data stored in memory in accordance with the typeface indicated by the typeface data to obtain modified image data; and
   image data output means for providing output image data to the image output device based on the modified image data.

32. A method of performing image processing on an image that includes text with characters having a dominant typeface, the image including connected components that form the characters in the text; the method comprising steps of:
   measuring distances across connected components in each of a plurality of directions and using the measured distances to obtain, for each direction, distribution data indicating a distribution of distances across connected components in the direction for the image; the step of measuring distances comprising measuring distances across a plurality of connected components, each distance being measured across one of the connected components; the plurality of connected components being in a plurality of the characters in the text; each distribution including distances across connected components from a sufficient number of the characters in the text that the distribution data indicate the dominant typeface; and
   using the distribution data for the plurality of directions to obtain typeface data indicating the dominant typeface.

33. An image processing machine comprising:
   memory for storing image data defining an image that includes text with characters having a dominant typeface, the image including connected components that form the text; and
   a processor connected for accessing the memory, the processor comprising:
      distribution obtaining means for using the image data to obtain, for each of a plurality of directions, respective distribution data indicating a distribution of distances across connected components in the direction, the distribution obtaining means obtaining each direction's distribution data by measuring distances across a plurality of connected components, each distance being measured across one of the connected components; the plurality of connected components being in a plurality of the characters in the text; each distribution including distances across connected components from a sufficient number of the characters in the text that the distribution data indicate the dominant typeface; and
      typeface obtaining means for using the distribution data for the plurality of directions to obtain typeface data indicating the dominant typeface.

* * * * *